United States Patent
Orand

(10) Patent No.: US 10,389,203 B2
(45) Date of Patent: Aug. 20, 2019

(54) OVERMOLD PROTECTION FOR VIBRATION MOTOR

(71) Applicant: NIKE, Inc., Beaverton, OR (US)

(72) Inventor: Austin Orand, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 221 days.

(21) Appl. No.: 15/398,795

(22) Filed: Jan. 5, 2017

(65) Prior Publication Data

US 2017/0117771 A1    Apr. 27, 2017

Related U.S. Application Data

(63) Continuation of application No. 13/828,085, filed on Mar. 14, 2013, now Pat. No. 9,570,955.

(51) Int. Cl.
| | |
|---|---|
| *H02K 5/12* | (2006.01) |
| *H02K 7/075* | (2006.01) |
| *H02K 15/12* | (2006.01) |
| *H02K 5/08* | (2006.01) |
| *H02K 7/06* | (2006.01) |

(52) U.S. Cl.
CPC ............ *H02K 5/12* (2013.01); *H02K 5/08* (2013.01); *H02K 7/06* (2013.01); *H02K 7/075* (2013.01); *H02K 15/12* (2013.01)

(58) Field of Classification Search
CPC .......... H02K 15/12; H02K 5/08; H02K 5/12; H02K 7/075; H02K 7/06
USPC .......................................................... 310/81
See application file for complete search history.

(56) References Cited

U.S. PATENT DOCUMENTS

| | | | |
|---|---|---|---|
| 2,492,431 A | 12/1949 | Kroeckel | |
| 2,808,238 A | 10/1957 | Spitler | |
| 3,152,790 A | 10/1964 | Meyer | |
| 3,157,804 A * | 11/1964 | Goodwin | B26B 21/38 30/45 |
| 3,340,742 A | 9/1967 | Chandler | |

(Continued)

FOREIGN PATENT DOCUMENTS

| | | |
|---|---|---|
| CN | 201639422 U | 11/2010 |
| DE | 102008053233 A1 | 2/2010 |

(Continued)

OTHER PUBLICATIONS

Apr. 20, 2015—(WO) ISR—App. No. PCT/US2014/027006.

(Continued)

*Primary Examiner* — Alex W Mok

(74) *Attorney, Agent, or Firm* — Banner & Witcoff, Ltd.

(57) ABSTRACT

A vibration motor assembly includes a vibration motor, an end cap having electrical contacts configured for supplying electrical power to the vibration motor, the end cap having a first connecting structure connecting the end cap to the vibration motor, and a capsule connected to the end cap to define a cavity. The vibration motor further has a shaft, and an eccentric mass is connected to the shaft. The vibration motor is configured to use electrical power to rotate the shaft and the eccentric mass to create a vibration effect. The end cap further has a second connecting structure connecting the capsule to the end cap. The vibration motor and eccentric mass are enclosed by the so-connected end cap and capsule, so as to enable the vibration motor assembly to withstand fabrication conditions.

30 Claims, 8 Drawing Sheets

(56) References Cited

U.S. PATENT DOCUMENTS

| | | | |
|---|---|---|---|
| 3,784,168 | A | 1/1974 | Schneider et al. |
| 5,462,388 | A | 10/1995 | Polacek |
| 5,564,824 | A | 10/1996 | Chaplin et al. |
| 6,104,115 | A | 8/2000 | Offringa et al. |
| 6,808,384 | B1 | 10/2004 | Jordan et al. |
| 6,867,520 | B2 | 3/2005 | Jennings |
| 7,265,465 | B2 | 9/2007 | Suzuki et al. |
| 7,510,537 | B2 | 3/2009 | Imboden et al. |
| 7,880,352 | B2 | 2/2011 | Du et al. |
| 7,888,832 | B2 | 2/2011 | Masato |
| 8,137,778 | B2 | 3/2012 | Kawano et al. |
| 2001/0046179 | A1 | 11/2001 | Lindley |
| 2003/0033207 | A1 | 2/2003 | Litke et al. |
| 2004/0181804 | A1 | 9/2004 | Billmaier et al. |
| 2005/0154988 | A1 | 7/2005 | Proehl et al. |
| 2006/0138885 | A1 | 6/2006 | Uchiumi et al. |
| 2007/0063602 | A1 | 3/2007 | Ibata et al. |
| 2007/0241626 | A1 | 10/2007 | Suzuki et al. |
| 2008/0126981 | A1 | 5/2008 | Candrian et al. |
| 2010/0270878 | A1 | 10/2010 | Park |
| 2010/0318442 | A1 | 12/2010 | Paul et al. |
| 2012/0221428 | A1 | 8/2012 | Harvill et al. |
| 2012/0239535 | A1 | 9/2012 | Leal |
| 2012/0253968 | A1 | 10/2012 | Cok et al. |

FOREIGN PATENT DOCUMENTS

| | | |
|---|---|---|
| GB | 1297329 A | 11/1972 |
| GB | 1379744 A | 1/1975 |
| KR | 20070108176 A | 11/2007 |
| KR | 20100007572 A | 1/2010 |
| KR | 20110058834 A | 6/2011 |
| KR | 20120029427 A | 3/2012 |
| WO | 01088824 A2 | 11/2001 |

OTHER PUBLICATIONS

Precision Microdrives, Enclosed Vibration Motors:: Uni Vibe Range, downloaded pages from http://www.precisionmicrodrives.com/vibrating-vibrator-vibration-motors/enclosed-vibration-motors; 5 pages, Oct. 22, 2013.

Precision Microdrives, RAB-016 : Experiments in Waterproofing / Overmoulding Vibration Motors, downloaded pages from http://www.precisionmicrodrives.com/application-notes-technical-guides/application-bulletins/ab-016-experiments-in-waterproofing-and-overmolding-vibration-motors, 6 pages, Sep. 16, 2013.

Precision Microdrives, Encapsulated Vibration Motors :: Pico Vibe™ Range downloaded pages from http://www.precisionmicrodrives.com/vibrating-vibrator-vibration-motors/encapsulated-vibration-motors, 4 pages, Sep. 16, 2013.

Namiki, Vibration Motors, downloaded pages from http://www.namiki.net/product/vibration/motor/tech.html, 3 pages, Sep. 16, 2013.

K'OTL Jinlong Machinery, Encapsulated Vibration Motors, downloaded pages from http://www.vibratormotor.com/encapsulated.html, 2 pages, Sep. 16, 2013.

Oct. 15, 2015—(EP) Office Action—App 14720367.3.

Jul. 11, 2014—(WO) ISR & WO—App. No. PCT/US14/11630.

* cited by examiner

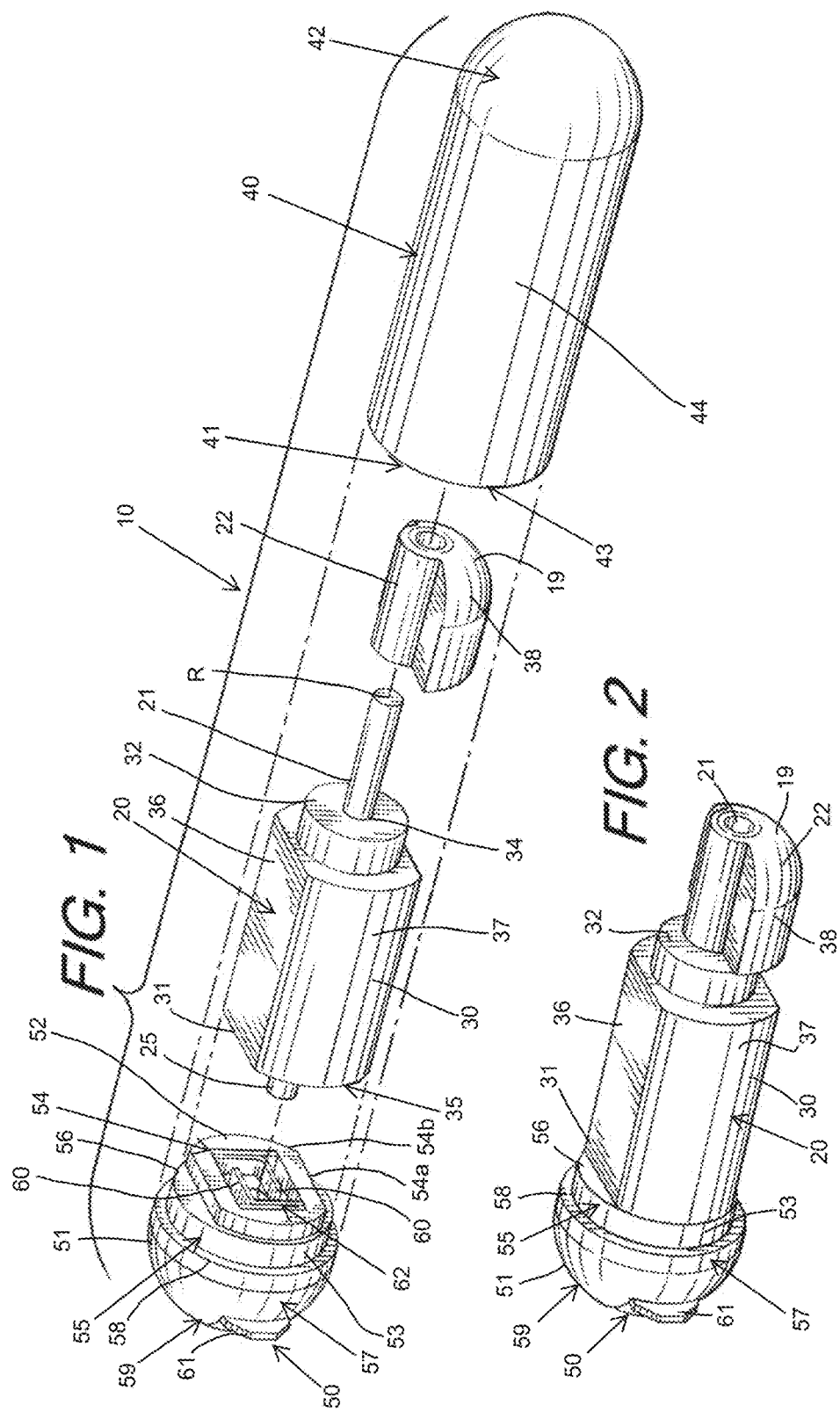

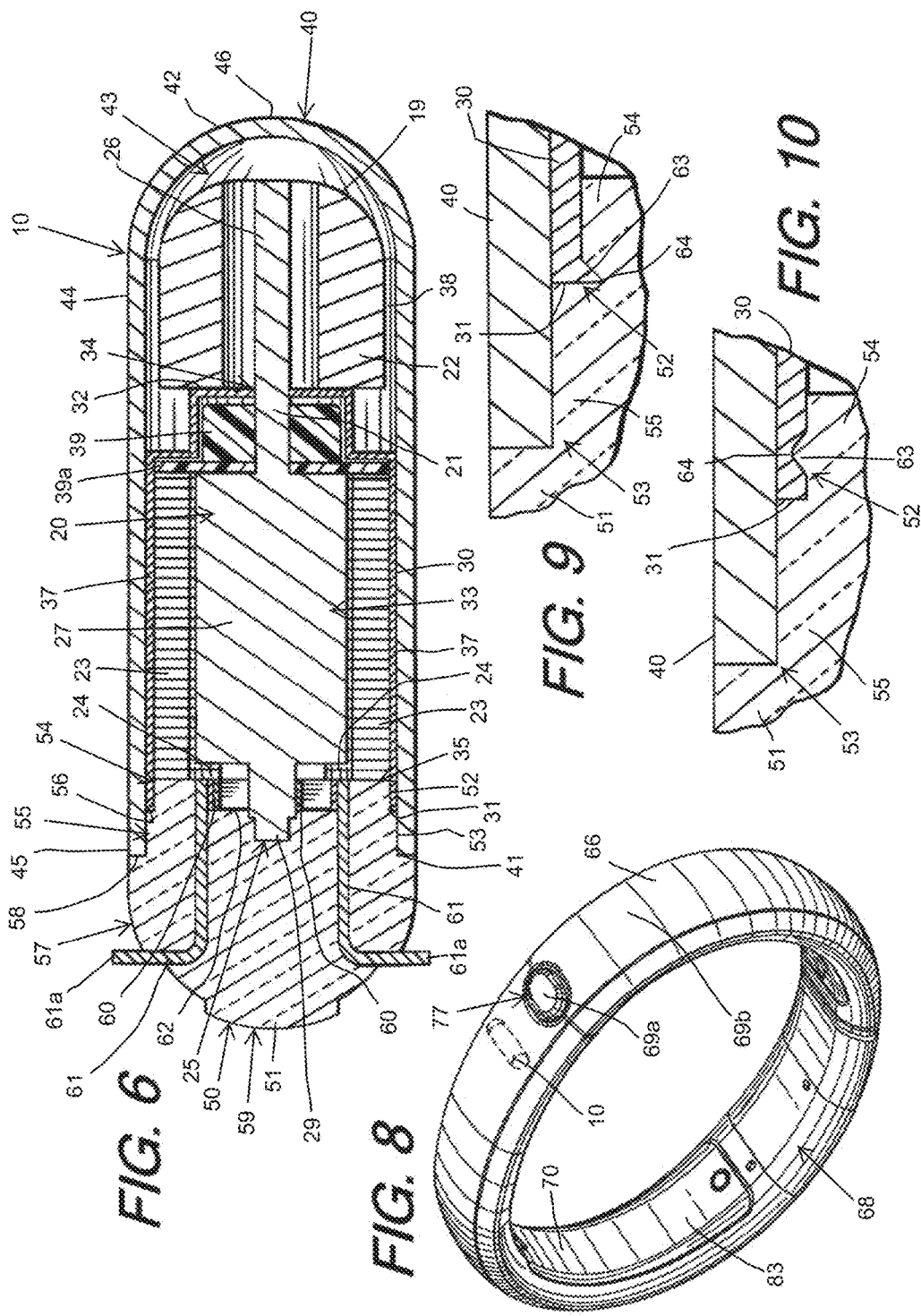

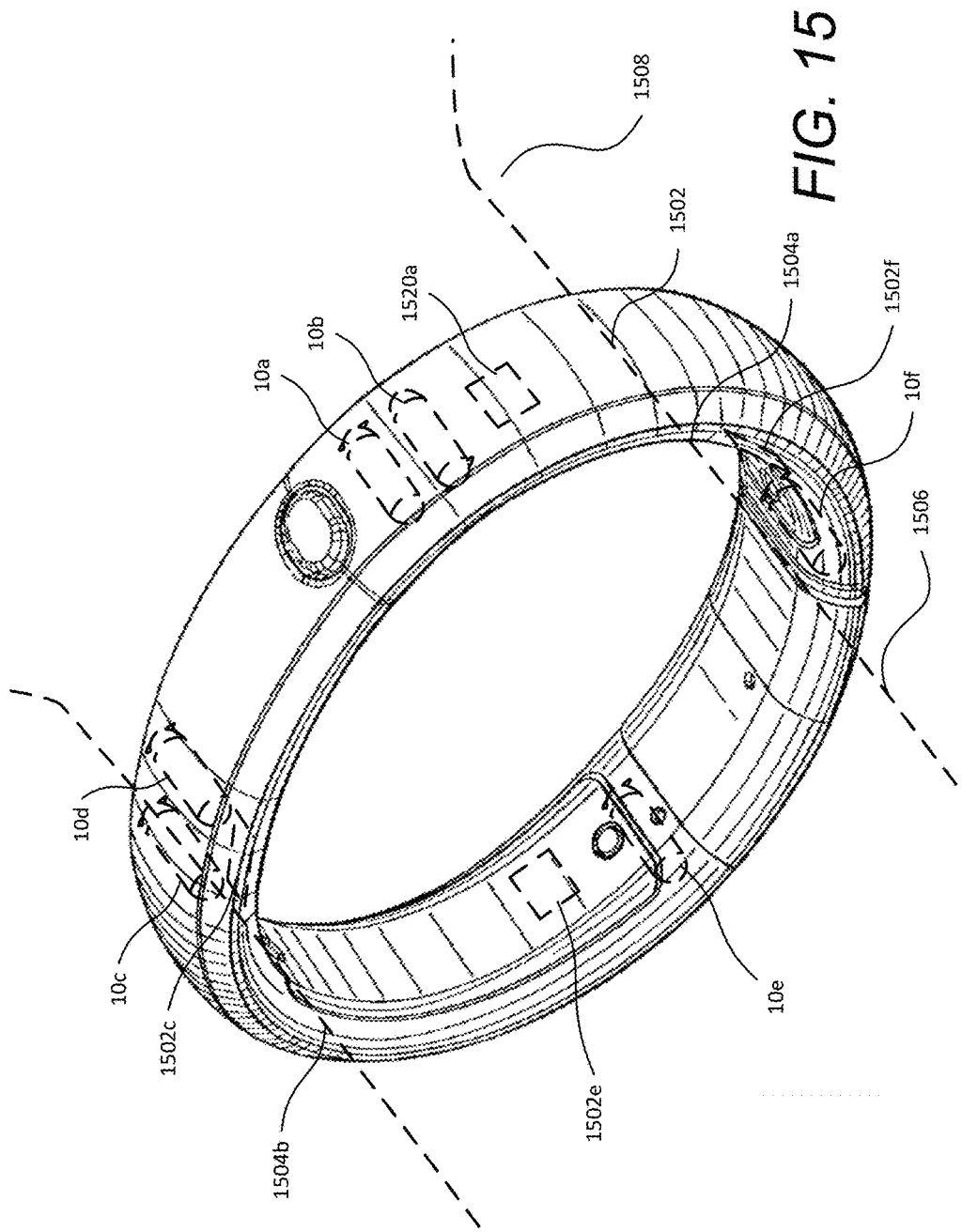

OVERMOLD PROTECTION FOR VIBRATION MOTOR

CROSS-REFERENCE TO RELATED APPLICATION

This application is a continuation of and claims priority to U.S. patent application Ser. No. 13/828,085, filed Mar. 14, 2013, which application is incorporated by reference herein and made part hereof.

TECHNICAL FIELD

The invention relates generally to structures for protection of vibration motors, and more specifically, to structures for encapsulating vibration motors to resist ingress of flowable substances, such as ingress of resin during an overmolding process.

BACKGROUND

Vibration motors are used in a wide variety of applications, including many electronic devices. As examples, vibration motors are used in tablet or laptop computers, cell phones, smart phones, PDAs, portable media/music players, and watches. In certain such devices, there are limited options for placement of such vibration motors, due to various reasons, e.g., the devices have internal space constraints and/or the device's functionality may be impeded or disrupted by the vibration motor, and/or the vibration motor may drain limited battery-sourced energy capacity. Accordingly, a need exists for technologies that provide enhanced options for placement and use of vibration motors in such devices, particularly devices having a small form factor or otherwise constrained internal space.

Moreover, a need exists for vibration motors for use in electronic devices, which motors are able to withstand more extreme conditions employed in the device's fabrication. For example, a need exists for vibration motors that, in a fabrication process, can withstand a molding process implicating high pressure and/or temperature, including pressures ranging up from, e.g., 3000 psi.

The present device and method are provided to address the problems discussed above and other problems, and to provide advantages and aspects not provided by prior vibration motors. A full discussion of the features and advantages of the present invention is deferred to the following detailed description, which proceeds with reference to the accompanying drawings.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the invention relate to a vibration motor assembly that includes a vibration motor, an end cap having electrical contacts configured for supplying electrical power to the vibration motor, the end cap having a first connecting structure connecting the end cap to the vibration motor, and a capsule connected to the end cap to define a cavity. The vibration motor further has a shaft, and an eccentric mass is connected to the shaft. The vibration motor is configured to use electrical power to rotate the shaft and the eccentric mass to create a vibration effect. The end cap further has a second connecting structure connecting the capsule to the end cap. The vibration motor and eccentric mass are enclosed by the so-connected end cap and capsule, so as to enable the vibration motor assembly to withstand fabrication conditions.

According to one aspect, the end cap is formed of a reinforced polymer material and the capsule is formed of a metallic material. According to another aspect, the capsule has a first end connected to the end cap and a second end having a domed configuration. The eccentric mass may have a rounded distal end positioned at the second end of the capsule in this configuration, to match the shape of the capsule.

According to a further aspect, the vibration motor may include a motor casing, where a distal portion of the shaft protrudes from the motor casing and the eccentric mass is connected to the distal portion of the shaft. The first connecting structure may further include a first section of a body of the end cap, the first section having a first outer periphery received within the motor casing to connect the end cap to the vibration motor. Additionally, the second connecting structure may include a second section of the body of the end cap, the second section having a second outer periphery that is larger than the first outer periphery, such that the second section is received within an open end of the capsule to connect the capsule to the end cap. Further, a first shoulder may be defined between the first section and the second section as a result of the second outer periphery being larger than the first outer periphery, and the body of the end cap may further include a third section connected to the second section and having a third outer periphery that is larger than the second outer periphery such that a second shoulder is defined between the second section and the third section. In one configuration, a proximal end of the motor casing may abut the first shoulder, and a proximal end of the capsule may abut the third shoulder. The first connecting structure may also include a tab located on the motor casing and configured to engage the body of the end cap. Still further, the first section of the end cap may include a slot, where the slot receives a proximal portion of the shaft, and where the electrical contacts are exposed within the slot and engage the proximal portion of the shaft.

Additional aspects of the invention relate to a vibration motor assembly that includes a vibration motor that contains a motor casing, a magnet positioned inside the motor casing, a shaft extending through the motor casing and having a proximal portion extending from a first end of the motor casing, a distal portion extending from a second end of the motor casing, and a middle portion positioned within the motor casing, and a wire winding mounted on the middle portion of the shaft. An eccentric mass connected to the distal portion of the shaft. The vibration motor assembly may further include an end cap having a body engaged with the vibration motor and electrical contacts engaging the proximal portion of the shaft and configured for supplying electrical power to the vibration motor. The body of the end cap may have a first section having a first outer periphery received within the first end of the motor casing and engaging the motor casing to connect the end cap to the vibration motor. The vibration motor assembly may further include a capsule connected to the end cap to define a cavity. In this configuration, the body of the end cap may have a second section having a second outer periphery that is larger than the first outer periphery, such that the second section is received within an open end of the capsule and engages the capsule to connect the capsule to the end cap. The vibration motor and eccentric mass are enclosed by the so-connected end cap and capsule, so as to enable the vibration motor assembly to withstand fabrication conditions, and the vibration motor is configured to use electrical power to rotate the shaft and the eccentric mass about an axis to create a vibration effect.

According to one aspect, the end cap is formed of a reinforced polymer material and the capsule is formed of a metallic material. According to another aspect, the capsule has closed end opposite the open end, with the closed end having a rounded dome configuration, and the eccentric mass has a rounded end positioned at the closed end of the capsule.

According to a further aspect, the end cap may also include tabs configured to engage the motor casing to retain the motor casing in connection with the end cap. Alternately, the motor casing may include tabs configured to engage the end cap to retain the motor casing in connection with the end cap. According to another aspect, the open end of the capsule may be press fit onto the second section of the end cap, and the connection between the capsule and the end cap may include a tab connection as well.

According to yet another aspect, a first shoulder is defined between the first section and the second section as a result of the second outer periphery being larger than the first outer periphery, and the body of the end cap further includes a third section connected to the second section and having a third outer periphery that is larger than the second outer periphery, such that a second shoulder is defined between the second section and the third section. The first end of the motor casing may abut the first shoulder, and the open end of the capsule may abut the third shoulder in this configuration.

Further aspects of the invention relate to an end cap for a vibration motor assembly. The end cap may include an end cap body configured to be engaged with a vibration motor, a pair of electrical contacts configured for engaging a shaft of the vibration motor to supply electrical power to the vibration motor, and a pair of electrical leads connected to the electrical contacts and extending through the end cap body to connect the electrical contacts to an exterior of the end cap. The end cap body has a first section having a first outer periphery, a second section having a second outer periphery that is larger than the first outer periphery such that a first shoulder is defined between the first section and the second section, and a third section having a third outer periphery that is larger than the second outer periphery such that a second shoulder is defined between the second section and the third section. The first section is configured to be received within a motor casing of the vibration motor to connect the end cap to the vibration motor. The second section is configured to be received within an open end of a capsule to connect the capsule to the end cap to enclose the vibration motor and to enable the vibration motor assembly to withstand fabrication conditions. The end cap body further has a slot within the first section, and the electrical contacts are exposed within the slot, such that the slot is configured to receive the shaft to permit the electrical contacts to engage the shaft.

According to one aspect, the end cap body is formed of a reinforced polymer material. According to another aspect, the electrical contacts are brush-type contacts. According to yet another aspect, the end cap body has a domed shape at an end opposite the slot.

According to a further aspect, the first outer periphery and the second outer periphery have different peripheral shapes, such that the first shoulder has a varying width at different locations around the first and second outer peripheries. In one configuration, the first outer periphery has two flat sides and two rounded sides, and the second outer periphery has a circular shape.

According to yet another aspect, each of the electrical leads may make at least one bend while passing through the end cap body between the electrical contacts and the exterior of the end cap.

Still further aspects of the invention relate to a method that includes providing a vibration motor assembly according to any of the aspects or embodiments described herein, establishing an electrical connection between the electrical contacts of the vibration motor assembly and an electronic assembly and/or to a power source, placing the vibration motor assembly and at least a portion of the electronic assembly and/or other article in communication with a mold cavity, and introducing a flowable substance into the mold cavity under fabrication conditions such that, upon the substance's solidification, the vibration motor assembly is connected to the electronic assembly and/or other article. The connection between the capsule and the end cap enables the vibration motor assembly to withstand the fabrication conditions during the overmolding process. The electrical contacts may be electrically connected to the electronic assembly and/or to a power source prior to introducing the flowable substance into the mold cavity.

Other features and advantages of the invention will be apparent from the following description taken in conjunction with the attached drawings.

BRIEF DESCRIPTION OF THE DRAWINGS

To allow for a more full understanding of the present invention, it will now be described by way of example, with reference to the accompanying drawings in which:

FIG. 1 is an exploded perspective view of an example embodiment of a vibration motor assembly according to aspects of the present invention;

FIG. 2 is a perspective view of a vibration motor of the vibration motor assembly of FIG. 1, connected to an end cap;

FIG. 6 is a cross-sectional view of the vibration motor assembly of FIG. 5, taken along lines 6-6 of FIG. 5;

FIG. 8 is a perspective view of an electronic device in the form of an activity monitoring device, including a vibration motor assembly as shown in FIG. 1 within an overmolded portion of the device;

FIG. 9 is a magnified cross-sectional view of a portion of an end cap and a motor casing according to an example embodiment of a vibration motor assembly;

FIG. 10 is a magnified cross-sectional view of a portion of an end cap and a motor casing according to an example embodiment of a vibration motor assembly;

FIG. 15 is a perspective view of an electronic device in the form of an activity monitoring device, shown being worn on a user's left arm (broken lines), and including a plurality of vibration motor assemblies as shown in FIG. 1 within overmolded portions of the device.

DETAILED DESCRIPTION

Figure 4:
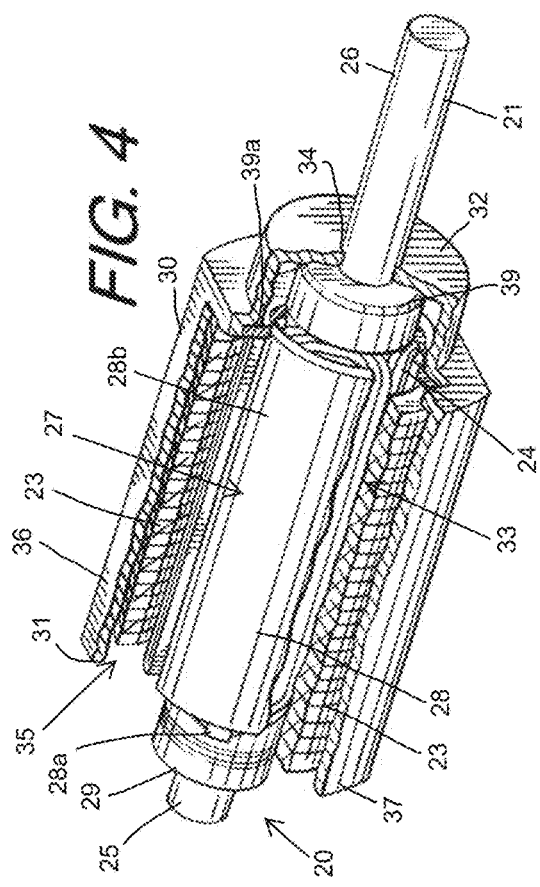
FIG. 4 is a perspective view of the vibration motor of FIG. 2, with portions of the vibration motor broken away to show internal detail.
Figure 3:
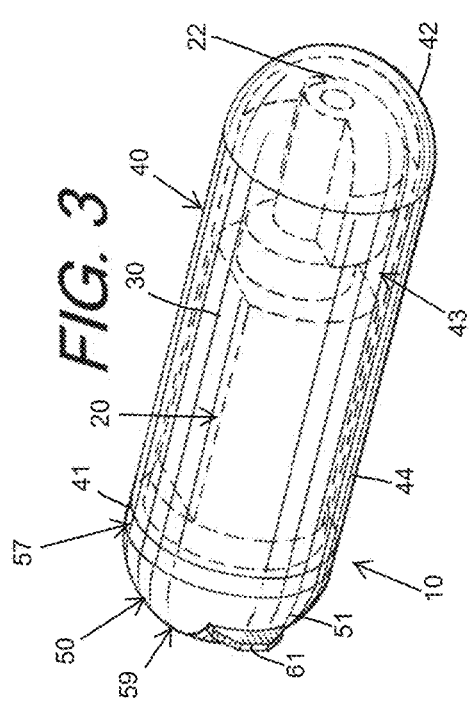
FIG. 3 is a perspective view of the vibration motor assembly of FIG. 1 in an assembled state.
Figure 5:
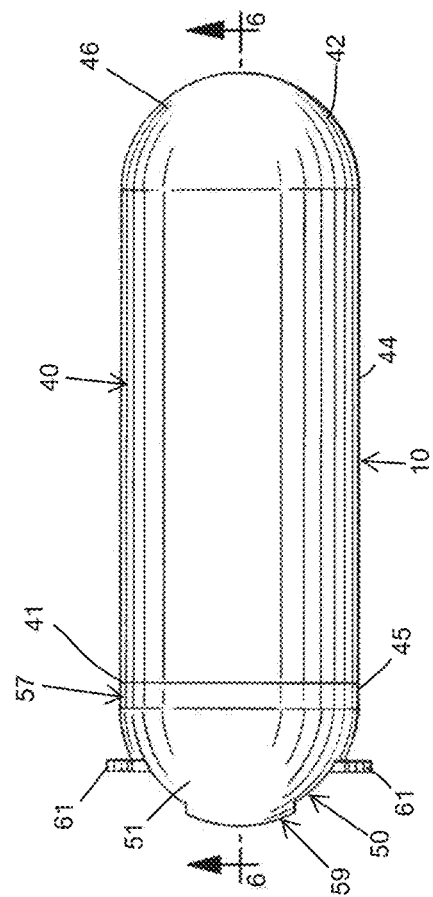
FIG. 5 is a side view of the vibration motor assembly of FIG. 1 in an assembled state.

In the following description, reference is made to the accompanying drawings, which form a portion hereof, and in which are shown by way of illustration various example devices, systems, and environments in which aspects of the invention may be practiced. When the same reference number appears in more than one drawing, that reference number is used consistently in this specification and the drawings refer to the same or similar part or object throughout. It is to be understood that other specific arrangements of parts, example devices, systems, environments or other objects may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this invention. It is also understood that, as used herein, "providing" refers broadly to making an article available or accessible, including, e.g., for present and/or future actions to be performed on, by or in connection with, the article; for further clarity, such term as used herein, does not denote, connote or otherwise imply that any party is providing such article or that, in providing the article, any party will or has manufactured, produced, or supplied the article, or that the party providing the article has ownership or control of the article, unless and except if any such diction is explicitly set forth. Also, the reader is advised that the attached drawings are not necessarily drawn to scale.

In general, descriptions herein relate to a vibration motor assembly including a vibration motor that is sealed, encapsulated, or otherwise enclosed, as well as methods for molding utilizing such a vibration motor and systems and methods for employing such a vibration motor assembly. Such vibration motor assemblies, according to at least some example embodiments, may include an eccentric mass, a vibration motor that includes a shaft on which is attached and rotates the eccentric mass, an end cap that is connected to the vibration motor, and a capsule that is connected to the end cap so as to enclose the vibration motor and eccentric mass. One or more such vibration motor assemblies may be employed in any of various electronic devices, any of which device's fabrication process is characterized by more extreme conditions that the vibration motor assemblies are enabled to withstand. As an example, such vibration motor assemblies are enabled to withstand, or to substantially withstand, a molding process implicating high pressure and/or temperature, including pressure ranging up from, e.g., 3000 psi. As an example of such withstanding capability, such vibration motor assemblies are enabled to resist, or substantially resist, ingress of flowable substance employed in an overmold process, which overmold process may use pressures of approximately or greater than 3000 psi and temperatures of approximately or greater than 220° C. As a more specific example of such withstanding capability, such vibration motor assemblies are enabled to resist, or substantially resist, ingress of flowable substance employed in an overmold process, which overmold process uses pressures of approximately 3000-5000 psi and temperatures of approximately 220° C. Such substantial resistance contemplates insubstantial ingress (including, e.g., no ingress) into a vibration motor assembly, which insubstantial ingress is understood to include any (or no) ingress, and which ingress, in any case, does not impede, disrupt or otherwise interfere, to any material degree or in any material way, with the vibration motor assembly's operation or purpose. As another example of such withstanding capability, such vibration motor assemblies are enabled to resist, or substantially resist, deformation, failure or other mechanical degradation of the vibration motor assembly resulting from a fabrication process, which fabrication process may use pressures of approximately or greater than 3000 psi and temperatures of approximately or greater than 220° C. As a more specific example of such withstanding capability, such vibration motor assemblies are enabled to resist, or substantially resist, mechanical degradation during an overmold process, which overmold process uses pressures of approximately 3000-5000 psi and temperatures of approximately 220° C. Such substantial resistance contemplates insubstantial mechanical degradation (including, e.g., no degradation) as to a vibration motor assembly, which insubstantial mechanical degradation is understood to include any (or no) mechanical degradation, of any nature, and which mechanical degradation, in any case, does not impede, disrupt or otherwise interfere, to any material degree or in any material way, with the vibration motor assembly's operation or purpose. Herein, the term "withstand fabrication conditions" is employed to contemplate resistance and/or substantial resistance, as described herein, under conditions described herein, as applied to any such ingress, any such mechanical degradation and/or any other failure mode that may otherwise be associated with impeding, disrupting or otherwise interfering with a vibration motor assembly's operation or purpose. Some aspects are described below with relation to various embodiments and variations. The various figures in this application illustrate examples of vibration motor assemblies, molding methods and use of such assemblies in devices, as well as other components and aspects of this invention.

Referring now to the figures, FIGS. 1-6 show, as an example embodiment, a vibration motor assembly 10, which vibration motor assembly 10 includes a vibration motor 20 having a shaft 21, an eccentric mass 22 attached to the shaft 21, a capsule 40, and an end cap 50. The capsule 40 and the end cap 50, as assembled, enclose the vibration motor 20, the shaft 21 and the mass 22.

As shown in FIGS. 1-6, an example vibration motor 20 includes the shaft 21, one or more magnets 23, one or more wire windings 24, and a motor casing 30. The shaft 21 is at least partially received within the motor casing 30 and extends through the motor casing 30, and has a proximal portion 25 that extends from a first or proximal end 31 of the motor casing 30, a distal portion 26 that extends from a second or distal end 32 of the motor casing 30, and a middle portion 27 that is positioned within the motor casing 30. In this configuration, the shaft 21 can rotate about an axis of rotation R. In example embodiments, the shaft 21 has a plurality of arms 28 that extend from the middle portion 27. The shaft 21 in FIGS. 1-6 includes three arms 28, the arms having spacing of approximately 120° around the shaft 21. In other example vibration motors 20, the shaft 21 may include a different number of arms 28, or may not include arms 28. Each of the arms 28 has a base 28a and a rounded flange 28b spaced from the axis R of the shaft 21, and each of the arms 28 has a wire winding 24 wound around the base 28a. The shaft 21 further has a commutator 29 at the proximal portion 25 that is electrically connected to the wire windings 24, and which is described in greater detail below. Generally, the shaft 21 is made of a metallic material, although other materials can be used. In example embodiments wherein a commutator 29 is used, at least the commutator 29 may be formed of a conductive material. It is understood that the arms 28 may be formed integrally with the shaft 21 or may be implemented as one or more separate pieces connected to the shaft 21. It is understood that the arms 28 may be formed of other than a metallic material, including as an example a polymer material (e.g., a material having lesser conductivity than a metallic material). The shaft 21 may also have a cap 39 near the distal end 32 of the motor casing 30, which may have a flange 39a to help keep the windings in place and/or stabilize the rotation of the shaft 21.

The motor casing 30 has an internal cavity 33 that encloses various components of the vibration motor 20, including the magnet(s) 23, the wire winding(s) 24, and the middle portion 27 of the shaft 21 in example embodiments as illustrated in FIGS. 1-6. The distal end 32 of the motor casing 23 has an opening 34 that allows the shaft 21 to pass out of the casing 23. The proximal end 31 of the motor casing 23 in example embodiments is fully open and includes an opening 35 that allows the shaft 21 to pass through and also is configured for connection with the end cap 50 as described below. The motor casing 30 shown in FIGS. 1-6 has a beveled cylindrical shape, with two opposed flat sides 36 and two opposed rounded sides 37, and the opening 35 at the proximal end 31 has a similar peripheral shape.

The vibration motor 20, as shown in the example of FIGS. 1-6, includes two separate magnets 23 located on opposite sides of the cavity 33 of the motor casing 30. As seen in FIG. 4, the magnets 23 are positioned adjacent the two rounded sides 37 of the motor casing 30. The two magnets 23 serve as opposite magnetic poles. In other example embodiments, the motor 20 may include more than two magnets 23, or may include a single magnet 23. Additionally, the vibration motor 20 in FIGS. 1-6 includes windings 24 that are wound around the arms 28 of the shaft 21. In example embodiments, all of the windings 24 are formed of a single wire that is connected to the commutator 29 of the shaft 21. As described herein, the windings 24 receive power through to electrical connection with the commutator 29 such that, when power is supplied to the windings 24, the interaction between the inductive effect of the windings 24 and the magnetic field of the magnets 23 causes rotation of the shaft 21. In some example embodiments, the motor 20 may include a different number of windings 24 and/or each winding may be formed of a separate wire.

It is understood that other embodiments and/or configurations of vibration motors exist, including other configurations of in-line vibration motors, and such other configurations may be used in connection with various example embodiments of a vibration motor assembly 10 in accordance with description herein. As an example, in some embodiments and/or configurations of vibration motors, the motor casing 30 may have a different shape (such as, e.g., by not including either or both flattened sides 36), and/or the magnet(s) 23 and/or the winding(s) 24 may be differently numbered, configured or otherwise provided, including, e.g., being located in different positions. As an example, in some embodiments and/or configurations of vibration motors, one or more components described herein may be omitted, such as, for example, the vibration motor 20 may not include a motor casing 30.

In example embodiments, such as shown in FIGS. 1-6, the capsule 40 has, substantially along its length, a circular-cylindrical external shape. Such example capsule 40 has an open end 41 and has, opposite to the open end 41, a closed end 42. The open end 41 is configured to provide for connection of the capsule 40 with the end cap 50. The closed end 42 of this example capsule has a dome-like configuration. In other example capsules, the closed end 42 may have other configuration, including, as examples, a hemispherical configuration, a semi-spherical configuration, or a configuration of, or substantially of, another selected section of a sphere. In still other example capsules, the closed end 42 may retain, or substantially retain, the cylindrical shape otherwise provided along the capsule's length, e.g., such that the capsule's closed end 42 may have a substantially planar configuration which configuration, in cross-section, describes (i) a circle or substantial circle (e.g., if such closed end is not perpendicular, or substantially perpendicular, to the capsule's length), (ii) an elliptic shape (e.g., if such closed end is substantially not perpendicular) or (iii) some other curved shape responsive to the closed end's orientation as referenced to the longitude of the capsule and to the capsule's external shape. It is also understood that, generally along its length, the capsule 40 may have alternative or additional external shape(s), including, e.g., as examples, elliptical-cylindrical, generalized-cylindrical (i.e., the cross-section may be any curve or curves), rectangular cuboidic (e.g., shaped like a rectangular box) or, generally, polygonal prismatic (e.g., along its longitude, being shaped substantially like a polygonal prism which prism, if the sides comprise a regular polygon and selected large in number, approaches a circular-cylindrical shape). In the event the capsule 40 may have alternative or additional external shape(s), the capsule's closed end 42 may have a dome-like configuration, such as that shown in FIGS. 1-6, or the closed end 42 may have hemispheric, semi-spheric, or other configuration, including any configuration described herein.

As described above, the capsule's external shape may be variously configured. In example embodiments, the capsule's external shape is configured responsive to the electronic device in which the capsule 40 may be used. In such examples, the capsule's external shape is configured responsive to the electronic device's form, particularly in the circumstance wherein the device's form contributes, limits or otherwise determines options for placement of such vibration motors that employ a capsule 40. Where the device has internal space constraints, for example, the capsule's external shape may be configured to exploit such internal space, e.g., toward enhancing performance of the vibration motor assembly employing such capsule 42. The capsule may be so configured including, e.g., by preserving such internal space so as to maximize the eccentric mass' size while enabling rotation of such eccentric mass 22 on the shaft 21, or otherwise to optimize vibration performance against such space constraints.

As shown in FIGS. 1, 3, 6 and 14, capsule 40 includes a cavity 43 along its length. The cavity 43 is defined by a wall 44. The cavity 43, so defined, has a proximal end 45 associated with the cavity's open end 41 and a distal end 46 associated with the cavity's closed end 42. As described herein, the cavity 43 is configured so as to receive the vibration motor 20 and the eccentric mass 22 attached to the motor's shaft 21, such that (i) the eccentric mass 22 is disposed in the cavity's distal end 46 and the motor 20 is disposed in the cavity's proximal end 45, and (ii) in operation, the vibration motor 20 may rotate the shaft 21 so that the eccentric mass 22 rotates around the axis of rotation R within the cavity 43, so as to provide vibration. As further described herein, the cavity 43 may also be configured so as to enable the capsule's connection with an end cap 50, which end cap 50 is connected to the vibration motor 20 opposite the eccentric mass 22, whereby (i) the capsule 40 and end cap 50 enclose the vibration motor 20 and eccentric mass 22 and (ii) a vibration motor assembly 10 is implemented that is enabled to be incorporated into an electronic device because the assembly 10 is enabled to withstand fabrication conditions that the assembly 10 encounters in the electronic device's fabrication.

Toward providing such vibration motor assemblies 10, the capsule 40 is implemented to contribute in withstanding fabrication conditions. As an example, the capsule 40 may be formed of a high strength material. For example, the capsule 40 may be formed of deep drawn steel, which may be heat treated after drawing in order to further increase strength. In another example, the capsule 40 may be formed of another metallic material or other material with sufficient strength to withstand fabrication conditions, e.g., pressures in an overmolding process ranging up from, e.g., 3000, including, as an example, pressures of approximately 5000 psi. Examples of other materials include (i) metals suitable for die casting, such as aluminum, zinc, and magnesium, (ii) other high strength metals, such as titanium and tungsten, and (iii) alloys of any or among these. Examples of yet other materials include reinforced polymers (such as carbon-fiber reinforced plastic (CFRP) and glass-reinforced plastic (GRP), or other composites. The material used for the capsule 40 may be selected based on considerations such as the fabrication conditions to be withstood (including, e.g., pressure and/or temperature), the thickness of the wall 44 (including, e.g., any variations), the presence and nature of supporting structure (e.g., the motor casing 30), or lack thereof, with respect to the wall 44 (including, e.g., relative to variations in thickness), the configuration of the capsule 40 (including, e.g., its cavity 43 and wall 44) and any space constraints imposed by the electronic device into which the vibration motor assembly 10 will be incorporated. In example embodiments, the thickness of wall 44 may be in the range of 0.3-0.5 mm.

In example embodiments, such as examples of FIGS. 1-6, the eccentric mass 22 may be attached to the distal portion 26 of the shaft 21, so as to be located outside the motor casing 30. In other example embodiments, the eccentric mass 22 may be located, in whole or in part, within the motor casing 30 or, in vibration motors 20 having no motor casing, the eccentric mass may be located adjacent any of the shaft cap 39, the shaft cap flange 39a, or other component(s) of the motor 20 (e.g., any such component distally disposed as to the motor, such as, at or about the transition associated with the shaft's middle and distal portions 27, 26.

The eccentric mass 22 is configured to rotate with the shaft 21 about the axis R. It is understood that, herein, the term "eccentric" refers to mass 22 having a center of mass that is located off of the axis R. For example, in example embodiments, the eccentric mass 22 may be shaped so as to be geometrically symmetrical with respect to the axis R, but be provided so as to locate its center of mass off of the axis R, e.g., by forming the mass 22 of plural materials, such materials having differing unit mass. The eccentric mass 22, when rotated about axis R, provides vibration.

In the example eccentric mass 22 shown in FIGS. 1-6, the mass 22 has a proximal section 38 and a distal section 19. The proximal section 38 may form, in shape, a half cylinder, substantially a half cylinder or other slice of a cylinder, which form may have (i) a planar, curved or compound surface, or other attachment component(s), disposed toward the axis R, and (ii) a round, rounded or otherwise curved surface disposed toward the cavity's wall 44, such that, e.g. (iii) a cross-section of the eccentric mass, taken lateral to the axis R, may describe a sector of a circle, or a segment of a circle with one or more polygonal radii attaching such segment to the shaft 21, or substantially any such segment or sector. The proximal section 38 has such curved surface disposed toward the cavity's wall 44 such that such curved surface is substantially adjacent, and is formed so as to substantially conform to the shape of, the cavity.

The distal section 19 may form, in shape, a hemisphere, a semi-sphere, or other section of a sphere, or a dome or other curved volume. In forming a curved volume, the section's surface may comprise plural planes, or concavities, or convexities, which together provide a compound surface of such curved volume (e.g., like the dimpled surface of a golf ball). The distal section 19 has its surface disposed toward the capsule's closed end. In some example embodiments, the distal section 19 has its surface disposed substantially adjacent to the wall 44 of the capsule's closed end 42, such that its surface is adjacent to, and is formed so as to substantially conform to the shape of, the cavity's distal end 46 at such closed end 42. It is understood that, in some example embodiments, including as shown in FIG. 6, the distal section 19 has its surface so disposed and so formed, albeit that such substantial conformance may not be as complete as may be possible.

As to the proximal section 38 and such distal section 19, such substantially conforming shapes may be implemented to provide a space, gap or other separation between the eccentric mass 22 and the cavity's wall 44, so that the eccentric mass 22 does not contact the wall 44 during the mass' rotation. In some example embodiments, the separation from the cavity's wall 44 may vary or be varied, including, e.g., (i) as to the proximal section 38 alone, (ii) as to the distal section 19 alone, (iii) as to the proximal and distal sections 38, 19 (i.e., the separation associated with each section, alone, is uniform or substantially uniform, but the separations differ between such sections 38, 19), or (iv) combinations of these. In example embodiments, the separation between the eccentric mass 22 and the cavity's wall 44 may be implemented so that the eccentric mass 22 will not contact the wall 44 during rotation. In certain example embodiments wherein the mass 22 may be subject to wobble during rotation, implementation of the separation may account for such wobble. In example embodiments wherein the mass 22 or the cavity 43 may be fabricated within specified tolerances (e.g., such specifications admitting the possibility of a large lateral dimension as to the mass 22 or a smaller lateral dimension as to the cavity 43), implementation of the separation may account for such tolerances. In example embodiments, by minimizing separation, the mass and/or center of mass of the eccentric mass 22 may be maximized within the cavity 43, so as to enhance vibration performance. In connection with such enhancement, it is understood that the potential size, center of mass and other characteristic(s) associated with the eccentric mass 22 and contributing to vibration performance may be limited, constrained or otherwise determined, in whole or in part, by the shape, volume or other dimensional attributes of the cavity 43, which cavity's dimensional attributes may in turn be limited, constrained or otherwise determined, in whole or in part, by the external shape, volume or other dimensional attributes of the capsule 40, which capsule's dimensional attributes may in turn be limited, constrained or otherwise determined, in whole or in part, by the shape, volume or other dimensional attributes of the space available for the vibration motor assembly 10 in the electronic device incorporating the assembly 10. It is also understood that any or all such dimensional attributes may be limited, constrained or otherwise determined, in whole or in part, by either or both (i) materials of the vibration motor assembly 10 and/or (ii) the fabrication process that withstood by the vibration motor assembly 10.

In example embodiments, the eccentric mass 22 may include a single material. In other example embodiments, the eccentric mass 22 may include more than one material, such as by including a more dense material distally from the shaft 21 and a less dense, structural material proximal the shaft 21. In example embodiments, the eccentric mass 22 includes a dense material, such as tungsten, toward enhancing vibration performance.

In example embodiments, the end cap 50 includes an end cap body 51 that includes (i) first connecting structure 52 for connection to the motor casing 30 and/or other components of the vibration motor 20, and (ii) second connecting structure 53 for connection to the capsule 40. In example embodiments as illustrated in FIGS. 1-6, the first connecting structure 52 is at least partially formed by a first section 54 of the body 51 that has a periphery configured to engage the proximal end 31 of the motor casing 30. In such example embodiments, the first section 54 is complementarily dimensioned with the opening 35 at the proximal end 31 of the motor casing 30, having two flat sides 54a and two rounded sides 54b to match the flat sides 36 and rounded sides 37 of the motor casing 30. Additionally, in such example embodiments, the second connecting structure 53 is at least partially formed by a second section 55 of the body 51 that has a periphery configured to engage the open end 41 of the capsule 40, as described in greater detail below. The second section 55 in example embodiments is dimensioned complementarily with the open end 41 of the capsule 40, e.g., having a circular cylindrical shape substantially matching the shape of the capsule 40 and/or the cavity 43. The first and/or second connecting structure 52, 53 may include further connecting structure, such as tabs, slots, or other engaging members, as described below and shown in FIGS. 9-10.

In example embodiments, the first section 54 of the body 51 has an outer periphery that is configured smaller than the outer periphery of the second section 55 of the body 51. For example, as to the body 51, the first section's outer periphery may have an outer periphery that is configured smaller in perimeter and/or in cross-sectional area than the second section's outer periphery. For example, as shown in FIGS. 1 and 6, the first section's outer periphery is recessed inwardly from the second section's outer periphery around the entire periphery of the first section 54, thereby defining a first shoulder 56 between the first and second sections 54, 55 around the entire outer periphery of the first section 54. Additionally, the body 51 of the end cap 50 in FIGS. 1-6 includes a third section 57 that has an outer periphery that is larger (both in perimeter and in cross-sectional area) than the outer periphery of the second section 55 of the body 51. In such example embodiments, the outer periphery of the second section 55 is recessed inwardly from the outer periphery of the third section 57 around the entire periphery of the second section 55, thereby defining a second shoulder 58 between the second and third sections 55, 57 around the entire outer periphery of the second section 55. In other example embodiments, the first and second shoulders 56, 58 may extend only around a portion of the outer periphery of the first section 54 and/or the second section 55. In example embodiments, the body 51 may have a domed rear end 59 such that, as connected to the capsule 40 shown in FIGS. 1, 3, 5, 6, 14, a vibration motor assembly 10 may have a pill-shaped configuration as depicted in FIGS. 1, 3, 5, 6, 14.

Figure 14:
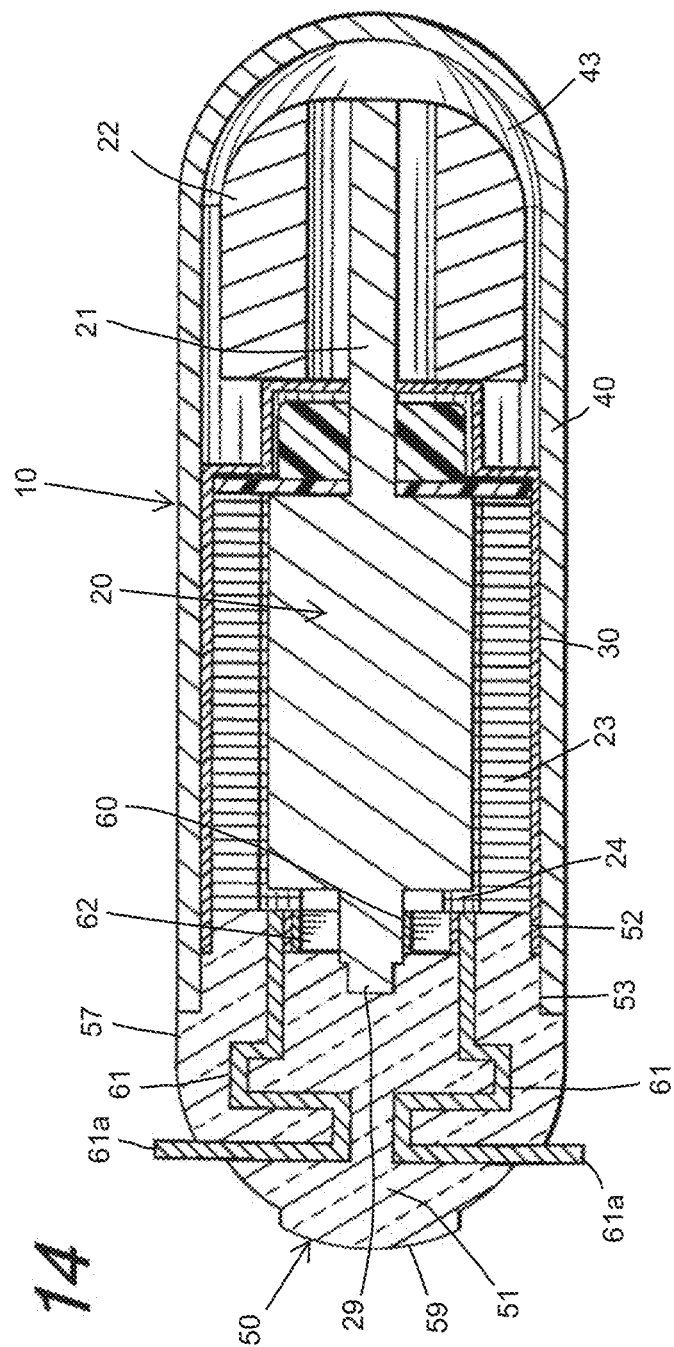
FIG. 14 is a cross-sectional view of an example embodiment of a vibration motor assembly according to aspects of the present invention.

The end cap 50 may additionally include electrical contacts 60 to provide electrical connection (e.g., to enable supply of electrical power and/or control signaling) to the vibration motor 20. In example embodiments, as shown in FIGS. 1-6, the end cap 50 includes brush-type electrical contacts 60 that are connected by leads 61 to a power source (e.g. a battery) of an electronic device and/or to other of such device's component(s) (e.g., whether electronic, electromechanical or otherwise). A different type of contact 60 and/or lead 61 may be used in other example embodiments. The leads 61 extend through the body 51 of the end cap 50 and exit through the rear end 59. The body 51 of the end cap 50 may be formed tightly (e.g. by molding) around the contacts 60 and leads 61. In example embodiments, the path taken by the leads 61 through the body 51 of the end cap 50 may not be straight or otherwise direct. As an example, the path so taken may be, as shown in FIG. 6, an L-shaped configuration, which configuration lengthens and complicates the path of the leads 61 through the end cap 50 (e.g., by comparison to a straight, substantially straight or otherwise direct or more direct path through the end cap 50). In other example embodiments, the leads 61 may take a longer and/or more complicated path(s) than the path shown in FIG. 6, including, e.g., by having one or more bend types (e.g., acute, obtuse, or otherwise), or one or more curve types (e.g., arcs, spirals), or combinations of bend types and/or curve types. example For example, as shown in FIG. 14, each lead 61 bends both inwardly (i.e. toward the center of the end cap 50) and outwardly (e.g. away from the center of the end cap 50) within the body 51 of the end cap 50, before reaching the contacts 60. It is understood that, in other example embodiments, the leads 61 may have three-dimensional bends or otherwise take complicated or tortuous paths through the end cap 50. In example embodiments, as shown in FIGS. 1-6, the leads 61 may omit an insulator coating, jacket or other covering (i.e., such as an insulator covering as is typical on wire leads used in typical vibration motors), which omission facilitates molding the end cap 50 tightly around the leads 61. It is understood that, by (i) employing tight formation of the body 51 around the leads 61, and/or (ii) providing lengthened and/or complicated paths of lead(s) 61 through the end cap 50, and/or (iii) omitting an insulator covering as to the leads 61, a vibration motor assembly 10 may be enabled to withstand fabrication conditions (e.g., resisting or substantially resisting ingress of a flowable substance along the lead(s), from the external portion 61a of a lead toward the vibration motor 20 and eccentric mass 22). It is also understood that, by configuring the leads 61 with materials, dimensions, and shapes, including as shown in FIGS. 1-6, a vibration motor assembly 10 may be enabled to withstand fabrication processes (e.g., resisting or substantially resisting mechanical degradation as to the external portions 61a of the leads 61). As well, it is understood that, notwithstanding the longitudinal dimensions of the end cap 50 (including its body 51 and domed read end 59) as depicted in FIGS. 6 and 14, the end cap's dimension along the rotation axis R may be configured and otherwise implemented so as to minimize the end cap's contribution to the overall length of the vibration motor assembly 10 (e.g., toward enabling incorporation of such an assembly 10 in an electronic device having space constraints, including to enhance options for orienting such assembly 10 therein). In example embodiments, as shown in FIGS. 1-6, the end cap 50 includes a slot 62 located in the first section 54 of the body 51, and the electrical contacts 60 are exposed within the slot 62. As described below, the slot 62 is configured to receive a portion of the shaft 21 such that the contacts 60 engage the shaft 21.

Figure 12:
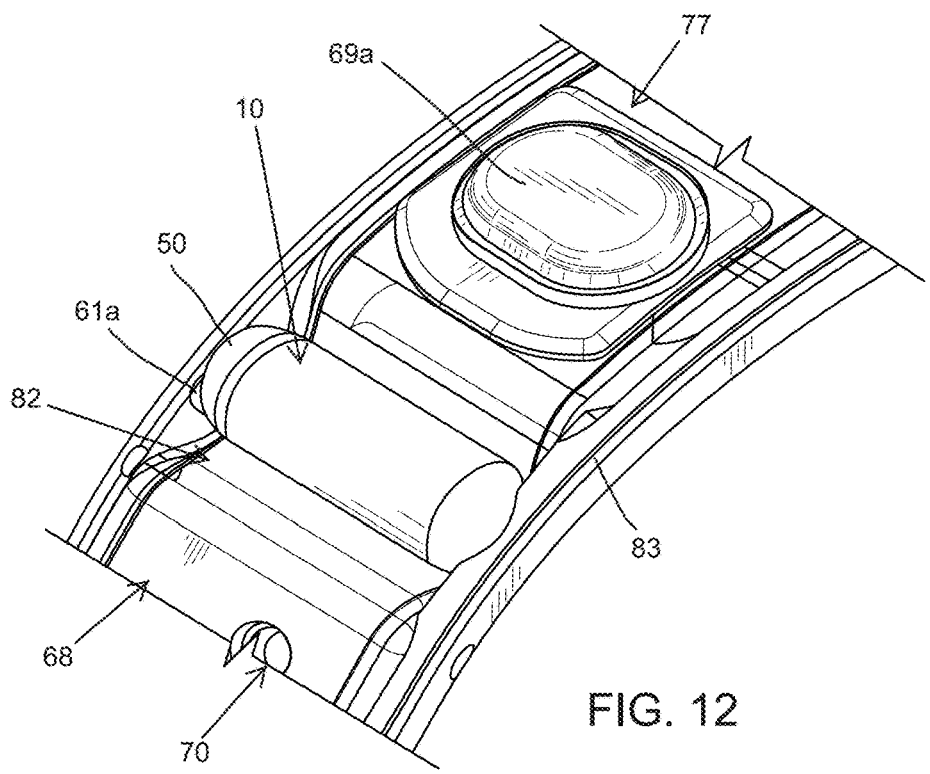
FIG. 12 is a magnified view of a portion of the electronic device of FIG. 8, including the vibration motor assembly as shown in FIG. 1, without the overmolded portion.
Figure 13:
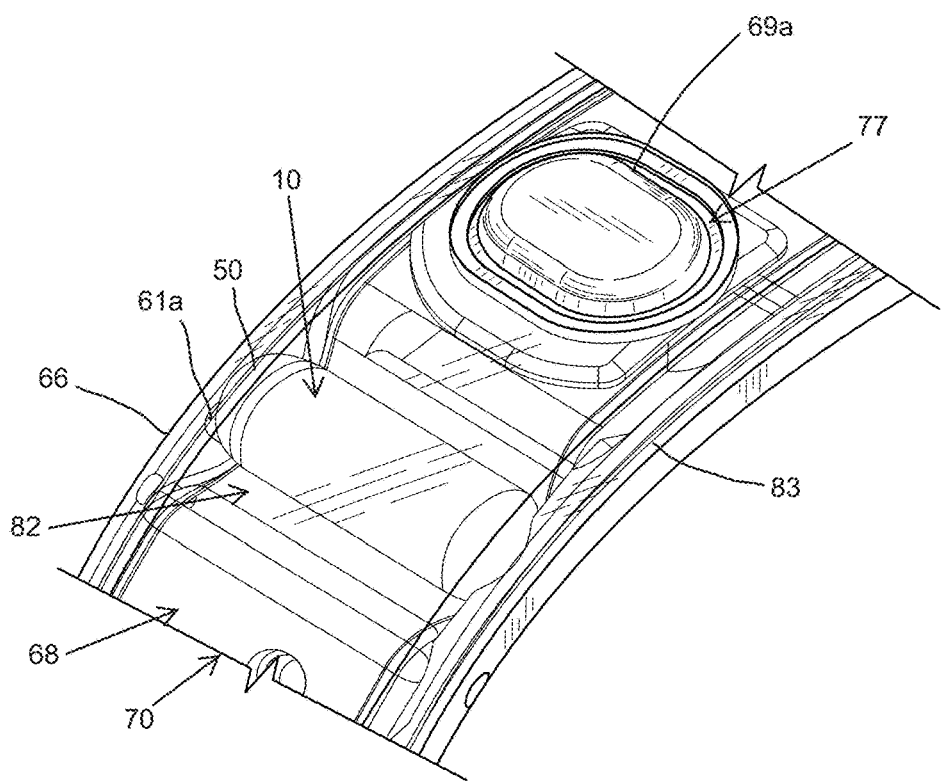
FIG. 13 is a magnified view of the portion of the electronic device as shown in FIG. 12, with the overmolded portion shown transparently.

The leads 61 may be connected to an electronic assembly 70 (e.g., so as to be connected to a power source, whether directly or indirectly through one or more other components). For example, in example embodiments, the external portions 61a of the leads 61 may provide a flat surface or other suitable surface for electrical connection, such as by soldering or other connection method. In some example embodiments, the external portions 61a of the leads 61 may be configured to fit (e.g., securely) in a compatible socket or other receptacle or other connection component of, and/or for connection to, an electronic assembly 70, a selected electronic, electro-mechanical or other component, or another article. Such a socket may include pads for soldering to the leads 61 and/or other retaining structure for engaging the external portions 61a of the leads 61, such retaining structure, including, e.g., clips, springs, slots, etc. An example of the positioning of the external portions 61a is shown in FIGS. 12-13, described below. FIGS. 12-13 do not show connections to the external portions 61a; however, it is understood that, in practice, connection components such as those described above may be provided for connection of the leads 61. It is also understood that other types of leads 61 and/or connection to the leads 61 may be used in these or other example embodiments. In example embodiments, the leads 61 may be alternatively provided or connected if the vibration motor assembly 10 employs an integral power source. For example, in some example embodiments, the vibration motor assembly 10 may contain an internal power source, wherein vibration may be activated by wireless communication (e.g. Bluetooth, Wi-Fi, etc.). In some example embodiments having an integral power source, the charging mechanism may not use external portions 61a to enable supply of power; for example, such charging mechanism may contemplate a wireless charging system (e.g., inductive charging), a self-charging system (e.g., a kinetic charging system), etc.

The end cap 50 may be formed of a variety of different materials, toward enabling a vibration motor assembly employing such end cap 50 to withstand fabrication conditions. In example embodiments, the body 51 may be made from a high strength, heat resistant material. Examples of high strength, heat resistant materials include various reinforced polymer materials such as, e.g., glass filled polyethylene terephthalate (PET), glass filled nylon, glass filled polybutylene terephthalate (PBT), glass filled poly(p-phenylene oxide) (PPO), polyether ether ketone (PEEK), and other such materials. The body 51 may alternately or additionally be formed of one or more die cast metallic materials (e.g. aluminum, zinc, magnesium, and alloys of the same), which may be coated with a non-conductive coating, such as by electrocoating or anodizing. In such example end caps 50, contacts 60 and leads 61 may be formed of a metallic material or other conductive material, including materials typically used for such electrical components. In example embodiments, the body 51 may be formed of a single, integral piece, such as by molding. For example, the body 51 may be directly molded around the contacts 60 and/or leads 61. In this way, the contacts 60 and/or leads 61 may be formed integrally with the body 51 (e.g., without need for potting compounds or other means for sealing the connections between body 51 and either/both the contacts 60 and/or the leads 61). This configuration provides additional strength by minimizing structural weak points as to the end cap 50 (e.g., toward enabling a vibration motor assembly 10 employing any such end cap 50 to withstand fabrication conditions). Each contact 60 and its respective lead 61, in example embodiments, may be formed of a single, integral piece, including, e.g., toward further enhancing the strength of the connection. In other example embodiments, the contacts 60 and/or the leads 61 may be connected to the body 51 after manufacturing.

As illustrated via FIGS. 1-6, the end cap 50 may be connected to the vibration motor 20 by connecting the motor casing 30 to the first connecting structure 52. To retain connection of end cap 50 to the vibration motor 20, as illustrated in FIGS. 1-2 and 6, the first section 54 of the end cap's body 51 is received within the opening 35 in the proximal end 31 of the motor casing 30 and engages the inner surfaces of the motor casing 30. The connection between the motor casing 30 and the end cap's body 51 may include mechanical connectors, such as the use of tabs. FIG. 9 illustrates example embodiments, wherein the motor casing 30 includes one or more tabs 63 that engage slots 64 on the first section 54 of the end cap body 51. FIG. 10 illustrates example embodiments, wherein the first section 54 of the end cap body 51 includes one or more tabs 63 that engage slots 64 on the inner surface of the motor casing 30. In example embodiments, the motor casing 30 may additionally or alternately be press-fit onto the end cap body 51 to secure the connection therebetween. In example embodiments, as illustrated in FIGS. 1 and 6, the proximal end 31 of the motor casing 30 confronts and/or abuts the first shoulder 56 between the peripheries of the first and second sections 54, 55 of the end cap body 51. Additional or alternate connection structures and features may be used in these and/or other example embodiments.

In example embodiments, when the motor casing 30 is connected to the end cap 50 as shown in FIGS. 1 and 6, the proximal portion 25 of the shaft 21 is at least partially received within the slot 62 in the end cap 50. In the embodiment shown in FIG. 6, the commutator 29 contacts the electrical contacts 60 and, thereby, establishes an electrical connection between the wire windings 24 and the external portions 61a of leads 61 (e.g., toward enabling electrical connection to an external power source, such as a battery). In embodiments employing brush-type electrical contacts 60, such contacts 60 remain in constant contact with the commutator 29 during rotation of the shaft 21. In other embodiments, different configurations for establishing an electrical connection for operation of the vibration motor 20 may be used.

The capsule 40 may be connected to the end cap 50 by connection to the second connecting structure 53. In example embodiments, as shown in FIGS. 1-6, to connect the capsule 40 to the end cap 50, the second section 55 of the end cap body 51 is received within the open end 41 of the capsule 40 and engages the inner surfaces of the capsule 40. To secure the connection between the capsule 40 to the end cap 50, the capsule 40 may be press-fit onto the end cap's body 51. As described above, the second section 55 of the body 51 is complementarily dimensioned with the open end 41 of the capsule 40 (e.g., having a circular cylindrical shape to substantially match the shape of the capsule 40). For a press-fit connection, these components are complementarily dimensioned, including that the inner dimensions of the open end 41 of the capsule 40 are selectively smaller than the outer dimensions of the second section 55 of the body 51. This arrangement eliminates gaps between the connected components and creates sufficient interference to achieve a secure press-fit connection in a vibration motor assembly 10 (e.g., toward enabling a vibration motor assembly 10 to withstand fabrication condition). It is understood that tight tolerances may be used for these components. It is also understood that complementary dimensions between the capsule 40 and the end cap 50 may account for and otherwise accommodate any differences in thermal expansion, e.g., due to differences in materials employed for such components. Additional or alternate connecting structures may be used in these or other example embodiments, such as the use of bonding materials or mechanically interlocking connections to further secure the connection.

In example embodiments, as assembled, the vibration motor 20 is received within the cavity 43, and is completely enclosed upon connection of the end cap 50 and the capsule 40 as described above. So assembled, the vibration motor assembly 10 is enabled to withstand fabrication conditions, e.g., with contributions therefor arising from the material, and structure of, land the security of the connections between, the end cap 50 and the capsule 40, as well as the security of the connections between the end cap's body 51 and the contacts 60 and leads 61.

The vibration motor assembly 20 operates by power supplied through the leads 61 and the contacts 60 to the wire windings 24, e.g., through a commutator 29. That is, as is known in the art, with power supplied to the wire windings 24, the magnetic field created by the windings 24 (through induction) interacts with the magnetic field of the magnets 23 in the vibration motor 20 so as to (i) cause rotation of the shaft 21 about the axis R, (ii) which rotation of the eccentric mass 22 attached to such shaft 21, and (iii) thereby, the eccentric mass 22, so rotating, causes the vibration motor 20 to vibrate. The vibrations of the vibration motor 20 are provided so as to be tactilely sensed by a user, and thus, power can be selectively applied to the vibration motor 20 to give the user a tactile vibration signal. The vibration motor 20 may be controlled by connection to an electronic assembly 70 and/or a component of such an assembly 70, as illustrated in FIGS. 7-8. It is understood that the vibration motor assembly 10 may be connected to plural electronic assemblies and/or plural components within one or more such assemblies. In other example embodiments, the vibration motor 20 may be powered by a power source and activated by use of a manually activated switch. It is understood that such a switch may be electrically connected to the vibration motor 20, e.g., by wiring, or may be remotely activated, such as by use of wireless transmitters and receivers.

Figure 7A:
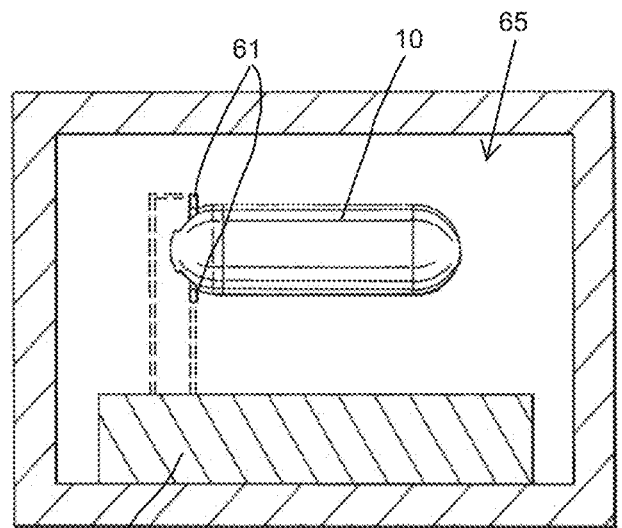
FIGS. 7a-7c are schematic views of an overmolding method utilizing the vibration motor assembly of FIG. 1.

An example embodiment of an overmolding process is depicted schematically in FIG. 7, wherein a vibration motor assembly 10 is provided for use in an overmolding process along with an electronic assembly 70. As shown in FIG. 7a, the vibration motor assembly 10 may be placed inside a mold cavity 65 or otherwise in communication with the mold cavity 65. As also shown in FIG. 7a, at least a portion of the electronic assembly 70 is also positioned within the mold cavity 65 (it being understood that the electronic assembly 70 may be separate in other overmold processes). The leads 61 of the vibration motor assembly 10 may be connected to the electronic assembly 70 prior to this overmolding process (e.g., by insertion of the vibration motor assembly 70 into a socket, and/or by soldering). Such connection contemplates electrical connection and/or mechanical connection. As described above, the vibration motor assembly 10 may be self-powered or powered in a different manner (e.g. wireless power). In vibration motors that are self-powered or powered in a different manner, the vibration motor assembly 10 may be utilized in an overmolding process without connection to an electronic assembly or component thereof, e.g., without electrical connection and/or without mechanical connection. In other example overmolding processes, the power source may be external to the overmold (e.g., the electronic device may provide for removable insertion of a power source, such as via a battery and a battery compartment), and the vibration motor assembly 10 may be overmolded in such process so as to be electrically connectable to such power source (e.g., so connected upon battery insertion in the battery compartment).

Figure 7B:
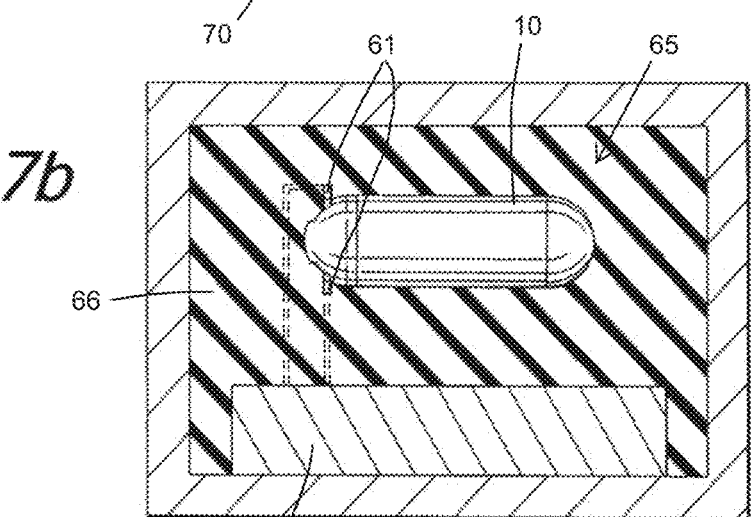
Figure 7C:
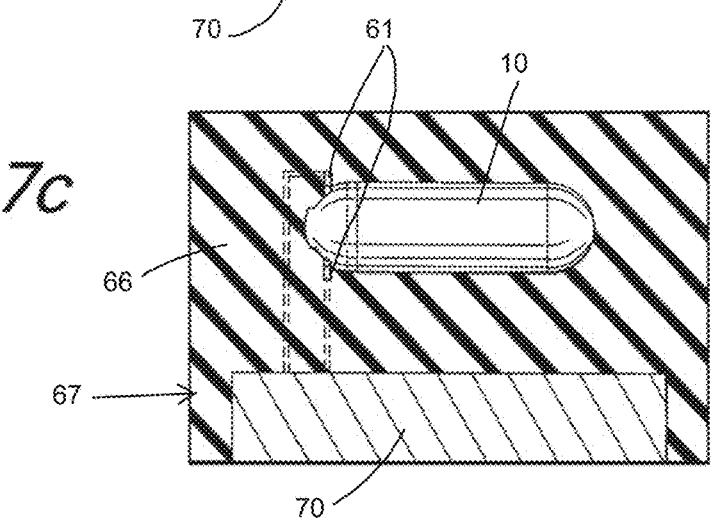

As illustrated in FIG. 7B, once the vibration motor assembly 10 and the electronic assembly 70 (and/or any other article(s)) are properly placed inside the mold cavity 65, the mold cavity 65 may be filled with a flowable substance 66. During the process, such flowable substance 66 solidifies around the vibration motor assembly 10 and at least a portion of the electronic assembly 70 and, thereby, connects the vibration motor assembly to the electronic assembly 70, forming an overmolded product 67, as illustrated in FIG. 7c. The flowable substance 66 may be flexible after solidification in some example overmolding processes. It is understood that the flowable substance 66 may fill the mold cavity 65 in FIG. 7b in liquid, semi-liquid or other flowable form. Examples of such flowable substances include thermoplastic polyurethane (TPU), thermoplastic elastomers (TPE), silicone materials, and other moldable elastomers, as well as other polymer resins such as nylon, acetal, polycarbonate, etc. Other examples of such flowable substances include other types of polymeric and/or composite materials. It is understood that such flowable substances may be selected for properties such as viscosity (e.g., at process temperature and pressure), strength, resilience, flexibility (e.g., following molding), bonding capability, compatibility with other materials, and/or other properties. To illustrate, in example overmolding processes, a flowable substance 66 may be selected due to having a viscosity of about 10 Pa·s, or more; in other example overmolding processes, a flowable substance 66 may be selected due to having a viscosity of about 1 Pa·s, or more; and in yet another example overmolding processes, a flowable substance 66 may be selected even if having a viscosity of up to 200 Pa·s. It is understood that this example overmolding process is shown and described in a simplified manner, and that additional steps and parameters may be involved in any implemented overmolding process. In example embodiments, an overmolding process may be used to connect the vibration motor assembly 10 to a component, apparatus or other article that is not a portion of an electronic assembly 70. Such an overmolding process may be conducted in the same or a similar manner as described above, with any such component, apparatus or article replacing the referenced portion of the electronic assembly 70.

Various electronic devices may incorporate various example embodiments of a vibration motor assembly 10 according to description herein, including, as examples, devices that utilize the vibration motor assembly 10 embedded within a solidified, overmolded, flowable substance. For example, FIG. 8 illustrates a so-embedded vibration motor assembly 10 as incorporated in an activity monitoring device 68. FIGS. 12 and 13 further illustrate the positioning and configuration of the vibration motor assembly 10 within the activity monitoring device of FIG. 8. In this activity monitoring device, the vibration motor assembly 10 is received within a cavity 82 defined by a structural frame 83 of the electronic assembly 70. As shown in FIGS. 12 and 13, the space for mounting the vibration motor assembly 10 is limited, and the vibration motor assembly 10 is configured so as to enable it to fit within that limited space. In this example embodiment, the vibration motor assembly 10 is embedded within solidified, overmolded, flowable substance 66 and is connected to the electronic assembly 70. In example embodiments, the electronic device may include plural vibration motor assemblies 10, which may be connected and positioned similarly to the assembly 10 illustrated in FIGS. 12-13. Examples of an activity monitoring device that may so incorporate a vibration motor assembly 10 are illustrated in U.S. patent application Ser. No. 13/287,047, filed Nov. 1, 2011, and published as U.S. Patent Application Publication No. 2012/0253485, which is incorporated by reference herein and made part hereof.

Various example embodiments of the vibration motor assembly 10 may be used in various electronic devices, including, e.g., tablet or laptop computers, cell phones, smart phones, personal digital assistants, portable media/music players, other types of touchscreen feedback devices, video game systems and controllers, watches, pagers, heart rate monitors, medical devices (especially small devices worn on the body), etc. Some of these devices may include an electronic assembly 70 as described above, so as to, e.g., control the vibration motor assembly 10 and/or supply power to it (such as, for example, when such assembly 10 is used in a phone to indicate an incoming call or message). Other devices may simply include a power source and a manual activation switch, such as when used in a massager, and may have either no computerized components or only very simple components. Further applications are recognizable to one skilled in the art, and the vibration motor assembly 10 is not limited by any particular application unless explicitly recited in the claims.

Figure 11:
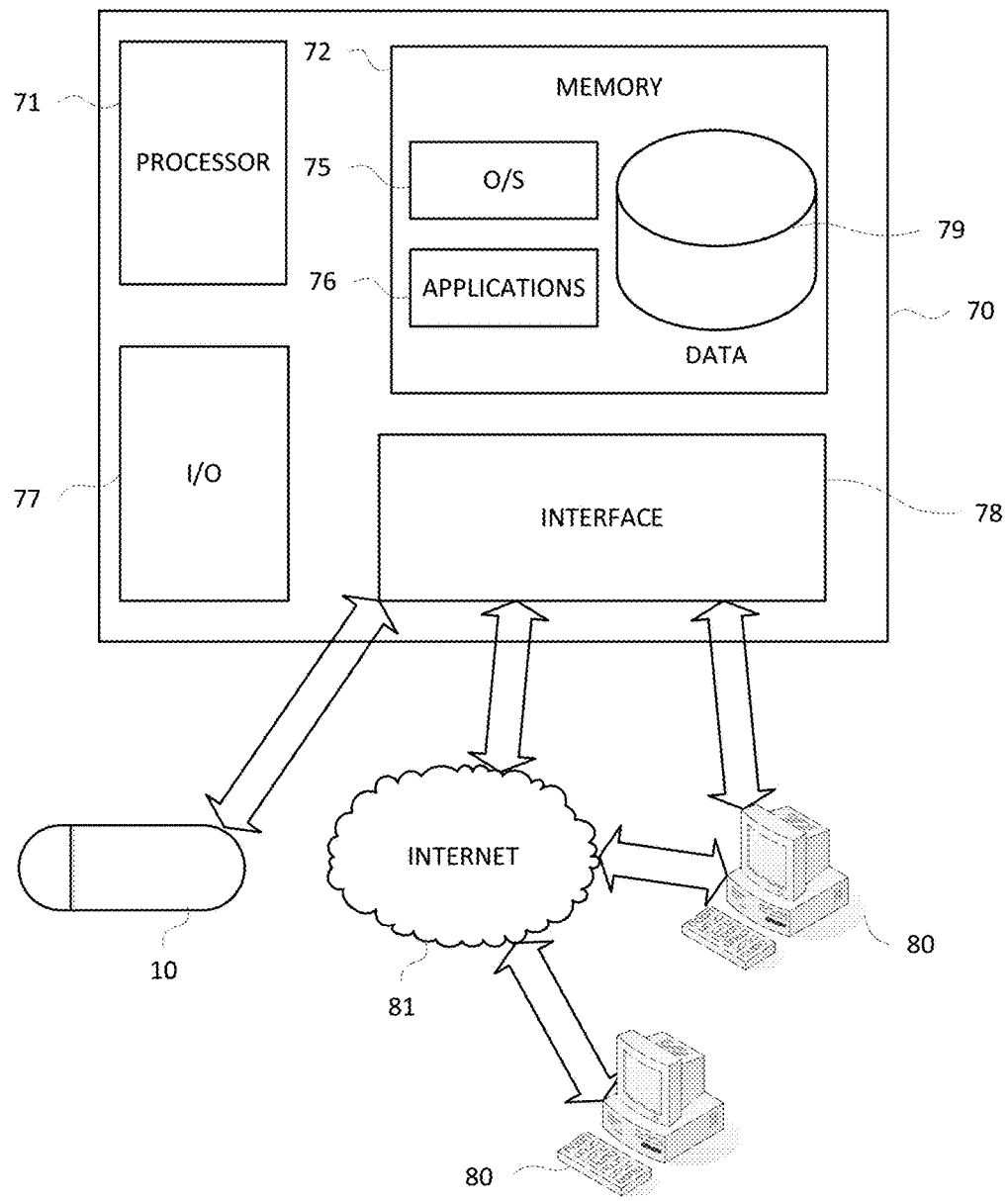
FIG. 11 is a schematic view of an example embodiment of an electronic assembly that may be usable in connection with the vibration motor assembly of FIG. 1.

Any such device's electronic assembly 70 may be and/or include one or more components, including, as examples: a printed circuit board assembly (PCBA) (not shown), electrical connections (e.g., traces, interconnects, wiring, etc.), and/or other components. Such other components, as illustrated in FIG. 11, may be variously provided, including, e.g., a processor 71, input/output (I/O) 77, and memory 72 (which may include RAM and/or ROM). The processor 71 may be employed, e.g., for controlling overall operation of the assembly 70 and its associated components, or for controlling overall operation of the electronic device and some or all of its components. I/O 77 may include a user input device through which, e.g., a user of the electronic device may provide input, which I/O 77 may include, e.g., a microphone, keypad, touch screen, mouse, and/or stylus, and may also include, e.g., one or more of a speaker for providing audio output and a video display device for providing textual, audiovisual and/or graphical output. In the example assembly 70 of FIG. 8, the I/O 77 includes a button 69a and an LED display 69b. The I/O 77 may also include one or more components for collecting data, information or other input, such as one or more components for collecting biometric input and/or audio input, a barcode or QR-code reader or other device for collecting graphic input, or other type of input device. The I/O 77 may also include one or more of various types of sensors, including single- or multi-axis accelerometers, gyroscopes, magnetometers, and/or other sensors for detecting acceleration and movement (linear and/or angular), as well as other types of sensors, such as sensors for detecting temperature, altitude, barometric pressure, humidity, GPS location, skin conductance, etc. The I/O 77 may also include one or more of various types of EM transceivers, e.g., for emitting selected electromagnetic radiation (e.g., by frequencies, amplitudes, etc.) toward a target (e.g., the user's skin) and detecting the radiation as it is reflected or otherwise returned (e.g., to detect distance or other parameters). Data collected by such sensors may be stored in memory 72 and/or made available, for example, for transmission to a remote location or system.

In example embodiments, software may be stored within memory 72 and/or other storage to provide instructions to processor 71 for enabling performance of the device's supported functions, including functions relating to the methods described herein. For example, memory 72 may store software, such as an operating system 75, application programs 76, and an associated database 79. Alternatively, some or all of the computer executable instructions may be embodied in hardware or firmware (not shown). As described in detail below, the database 79 may provide centralized storage of information, which may include, as an example, athletic performance and/or activity monitoring information. In other example embodiments, the memory 72 may not include a database 79, and may store data in another manner.

It is understood that, as to example electronic devices as shown in FIG. 11, a single electronic assembly 70, a single processor 71, a single memory 72, a single I/O 77 and a single vibration motor assembly 10 are shown and described for sake of simplicity. It is also understood that example electronic devices may employ one or more vibration motor assemblies 10, one or more electronic assemblies 70, one or more processors 71, one or more memories 72, one or more I/Os 77, in any combination thereamong, or in any combination thereamong with other component(s), apparatus(s) and/or article(s). It is further understood that any such implementation may be responsive to, and toward achieving, purposes, functions and/or other specifications that may be associated with the respective electronic device and/or electronic assembly 70 or assemblies 70 thereof. It is also understood that example embodiments of an electronic device and/or an electronic assembly 70 may not include all of the components described herein and/or illustrated in FIG. 11, and/or the electronic device and/or electronic assembly 70 may include additional components.

An electronic device employing a vibration motor assembly in accordance with description herein may be configured to operate in a networked environment supporting connections to one or more hosts or nodes (herein, "network device"). An electronic device so configured may so operate, e.g., so as to distribute data analysis, signal processing or other operations among one or more network devices. Any such network device may be variously provided, including, e.g., as an electronic device of the same or similar specification than electronic device(s) described herein, as an electronic device of dissimilar or otherwise different specification than electronic device(s) described herein, as a computer device (e.g. a terminal 80) or otherwise. Any such network device may include any of the components and/or features of an electronic device, an electronic assembly 70 and/or a vibration motor assembly 10, as described and/or illustrated herein, as well as other components and/or features. The terminals 80 may be personal computers, servers, mobile devices, etc. An electronic device employing a vibration motor assembly in accordance with description herein may connect to terminals 80 or other network device using a variety of different network connections, such as a wide area network (WAN) which may include connection to the internet 81, a local area network (LAN), a cellular/mobile network, and/or other communication paths. Protocols such as TCP/IP, Ethernet, FTP, HTTP, etc., may be used. One or more communications interfaces 78 generally provide connections to these various networks and network devices. The interface 78 may include a network interface or adapter (e.g., for LAN networking), a modem (e.g., for WAN networking), and/or transceivers for Wi-Fi, Bluetooth, infrared or other optical communication, near field communication (NFC), among other means. Additionally, an application program 76 may include computer executable instructions for invoking user functionality related to communication. It will be appreciated that the network connections shown are exemplary and other means of establishing a communications link may be used.

The electronic assembly 70 may also connect to the vibration motor assembly 10, which may be accomplished through the interface 78 and/or through different types of connections. The connection between the electronic assembly 70 and the vibration motor assembly 10 may be wired and/or wireless, and in example embodiments, the vibration motor assembly 10 may be incorporated as part of the electronic assembly 70. The electronic assembly 70 may include software, such as an application program 76, to control the operation of the vibration motor assembly 10.

As described above, in some examples, an electronic device may include plural vibration motors, which may include one or more vibration motor assemblies 10 as described above, and which may also include one or more different types of vibration motors. In such examples, one or more electronic assemblies 70 may include software to control the operation of such vibration motors. In some examples, one or more electronic assemblies 70 may be programmed or otherwise configured for selectively activating one or more of the vibration motors. Such selective activation may be variously provided, including toward optimizing vibration performance. As an example, an electronic assembly 70 may be programmed or otherwise configured to selectively activate one or more vibration motors based on the orientation, position, and/or movement of the electronic device and/or the electronic assembly 70 (or one or more other electronic assemblies of such electronic device), e.g., in order to produce vibration that enhances the possibility that the user will perceive the vibration and/or to produce vibration that may be most strongly perceived by the user and/or to produce vibration (e.g., in a pattern) that may signal the user as to an event or condition. The orientation, position, and/or movement of the electronic device or any associated electronic assembly 70 may be determined based on data from movement sensors (e.g., frequency signatures acquired from accelerometer(s) and/or gyroscope(s)) and/or other sensors. So selectively activating one or more vibration motors may enhance perception of vibration in various ways, including, e.g., by activating adjacent motors at once, by activating various motors in a pattern, or otherwise. Any such selective activation can increase the likelihood of the user detecting the vibration of the vibration motor(s), while conserving battery life, e.g., by not activating one or more vibration motors that are less likely to be detected.

As shown in FIG. 15, an example activity monitoring device 1500, as worn by a user at or adjacent the wrist/forearm connection 1502, may include plural vibration motor assemblies 10. For example, the device 1500 may include vibration motor assemblies 10*a-f* at selected locations disposed around the periphery of the device 1500. The assemblies 10 may be so disposed, e.g., at regular separations, at locations wherein the device 1500 has space to accommodate one or more assemblies 10, or in combinations of these locations, including omissions from any regularly separated location, such as due to the device's space constraints. The assemblies 10 may be alternatively or additionally disposed, including by placing at least one assembly 10 at a device location that, in the device's use, tends to be in contact, or near contact, with the user, particularly user's body parts which have enhanced sensitivity to vibration. As to the device 1500, in use, the assemblies may be disposed that tends to be in contact, or near contact, with the styloid processes 1504*a,b* of either/both the radius or/and ulna bones of the user's forearm 1506. As to such alternative/additional disposition, as shown in FIG. 15, the device 1500 includes: (i) a pair of vibration motor assemblies 10*a,b* disposed adjacent to the styloid process 1504*a* of the user's radius, in association with the topside (posterior) of the wrist/forearm connection 1502; (ii) a pair of vibration motor assemblies 10*c,d* disposed adjacent to the styloid process 1504*b* of the user's ulna, in association with the topside (posterior) of the wrist/forearm connection 1502; (iii) a vibration motor assembly 10*e* disposed adjacent to the styloid process 1504*b* of the user's ulna, in association with the underside (anterior) of the wrist/forearm connection 1502; and (iv) a vibration motor assembly 10*f* disposed adjacent to the styloid process 1504*a* of the user's radius, in association with the underside (anterior) of the wrist/forearm connection 1502. It is understood that, although this example shows the assemblies in such numbers and groupings, other numbers and groupings may be employed, including, as examples, (a) either or both of the paired assemblies 10*a,b* or 10*c,d* may be replaced by a single assembly 10 or may have one or more additional assemblies 10 therewith, (b) either or both of the example's unpaired assemblies 10*e*, 10*f* may have one or more additional assemblies 10 therewith, and (c) any one or more of the example's paired or unpaired assemblies 10 may be removed, such that there are no assemblies 10 at the removed locations. In example embodiments associated with an activity monitoring device 1500, the number, groupings and locations may be determined, at least in part, with reference to the user's gender and device sizing (e.g., SMALL, MEDIUM, or LARGE, including with or without extensions for adjusting such sizing to the user).

As shown in this example, the pair of vibration motor assemblies 10*a,b* are oriented so that the eccentric mass 22 of the assembly 10*a* is adjacent to the end cap 50 of assembly 10*b*. As also shown in this example, the pair of vibration motor assemblies 10c,d are oriented so that the eccentric mass 22 of the assembly 10c is adjacent the eccentric mass 22 of assembly 10d. It is understood that both such orientations are examples, and that either such orientation may be implemented for both such pairs. In examples wherein more than two assemblies 10 are located adjacent one another, any combination or variation in orientations may be employed, including, if practicable, aligning at least one assembly 10 along, rather than lateral to, the device's periphery. Any such orientation(s) may be determined, in part (or not), by reference to an assembly's vibration profile (i.e., the direction(s), and amplitude(s) thereof, as to which an assembly throws its vibrations), including in light of the device's positioning relative to the body part.

In this example, as described above, plural vibration motor assemblies 10 may be employed so as to enhance opportunity for contact of one or more assemblies, at any given time, with the user's body. Alternatively or additionally, plural vibration motor assemblies may be employed so as to provide vibration patterns among such assemblies, which patterns may be crafted toward enhancing the likelihood that the user may perceive the vibrations. Such patterns may be crafted by factoring in one or more of, as examples, sensitivities of relevant body parts to vibration, the likelihood of contact based on the device and its use, the user's gender and device sizing (as described above), and/or any information derived from past vibrations (e.g., such as user acknowledgement thereof, including via interaction with the device 1500). In some example embodiments, such pattern(s) may be crafted so as to signal specific events or conditions. Alternatively or additionally, plural vibration motor assemblies 10 may be employed (i.e., together with other hardware and software of device 1500) so as to enable selectively activating one or more vibration motor assemblies 10 based on determination that such vibration motor assemblies 10 are or are likely to be in contact or near contact with the user, particularly user's body parts which have enhanced sensitivity to vibration, so as to enhance opportunity of the user's perception of the vibration. Such determination may be variously achieved, including, e.g., based on data from movement sensors (e.g., frequency signatures acquired from accelerometer(s) and/or gyroscope(s)) and/or other sensors (e.g., a skin conductance sensor and/or an EM transceivers). As shown in FIG. 15, the activity monitoring device 1500 may employ one or more such sensors and/or EM transceivers, including accelerometers and/or gyroscopes embedded generally within the device, and/or sensors/EM transceivers 1520 provided in association with respective vibration motor assemblies 10. To illustrate, the device 1500 may activate the vibration motor assembly 10e upon determining body contact via skin conductance and/or via EM reflection, as enabled through data acquired by the device 1500 via sensor/EM transceiver 1520e. It is understood that, although a skin conductance sensor and/or EM transceiver may be provided in association with each vibration motor assembly 10, provision of such components may be otherwise implemented. For example, such sensors/EM transceivers may be associated only with selected vibration motor assemblies 10 a, b, c, d, of device 1500, which association may be employed based on information that the device 1500, as used, is most likely to have user contact or near contact with such assemblies. In such example, body contact in accordance with such detection of such contact or near contact leads to activation of the respective assemblies 10a, b and/or 10 c,d; and, in the event that no such body contact is detected, activation of vibration motor assemblies may be directed to one or the other or both of assemblies 10 e, f, or otherwise follow a pattern that may or may not include or emphasize such assemblies 10 e, f.

In an activity monitoring device, such as is shown in FIGS. 8 and 15, the electronic device and/or any associated electronic assembly 70 may include software that works with data provided by movement sensors, such as accelerometers, gyroscopes, magnetometers, skin conductance sensors, EM transceivers etc., to distinguish between movement data generated by user movement (i.e., monitored activity data) and movement data that may be generated due to vibration of the vibration motor assembly 10 (i.e., spurious data).

Several example embodiments have been described above, including example embodiments in accordance with the Figures. It is understood that any of the features of these various example embodiments may be combined and/or interchanged.

Embodiments of vibration motor assemblies in accordance with description herein provide benefits and advantages over existing products. For example, the combination of the end cap 50 and the capsule 40 provides sufficient strength and sufficiently secure sealing to withstand fabrication conditions. In example embodiment, the assembly 10 can achieve this capability with a capsule 40 having thin walls (0.3-0.5 mm), due at least in part to, e.g., the strong and stable configurations of the capsule 40 and end cap 50, the secure connections between the capsule 40 and the end cap 50, and the integrated nature of the end cap 50 (including as to any leads 61 therethrough) that can minimize or avoid weak points in the structure. The capsule 40 and end cap 50 resist ingress of flowable substances during such an overmolding process, and/or may resist ingress of other flowable substances in other applications as well. Additionally, use of the end cap 50 for integration of the electrical contacts 60, and connection of the motor casing 30 and the capsule 40, reduces the required space for these components, such that the vibration motor assembly 10 may be made relatively small in size. As one example of a relatively small sized vibration motor assembly 10, an assembly's lateral dimension (e.g., lateral to the rotation axis R) may be in the range of 4-5 mm (e.g. about 4.6 mm), or less, with a length of the assembly 10 (e.g., along rotation axis R) may the up to around 15 mm, or less This relatively small size permits the vibration motor assembly 10 to be used in small or space-constrained devices that may not be able to accommodate a larger vibration motor, while still having an eccentric mass 22 that produces large enough vibrations to be felt by the user. Further benefits and advantages are described herein or are otherwise recognizable to those of ordinary skill in the art.

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:
1. An electronic assembly comprising:
  a structural body comprising a frame member and an overmolded polymer material connected to the frame member; and
  a vibration motor assembly embedded within the overmolded polymer material, the vibration motor assembly comprising:
    a capsule having a cavity;

a vibration motor having a shaft and configured to rotate the shaft;

an eccentric mass connected to the shaft, wherein the eccentric mass is rotatable with the shaft; and an end cap having a first connecting structure connecting the end cap to the vibration motor and having and a second connecting structure connecting the capsule to the end cap, wherein the vibration motor and eccentric mass are disposed in the cavity and are enclosed by the end cap and capsule.

2. The electronic assembly of claim 1, further comprising a computer processor and a memory mounted on the structural body.

3. The electronic assembly of claim 1, further comprising a power source mounted on the structural body and connected to the vibration motor assembly to power the vibration motor.

4. The electronic assembly of claim 1, wherein the electronic assembly is a wearable device, and wherein the structural body is structured to enable the wearable device to be worn on a user's body.

5. The electronic assembly of claim 1, wherein the vibration motor and eccentric mass being enclosed by the end cap and the capsule enables the vibration motor assembly to withstand fabrication conditions of an overmolding process to form the overmolded polymer material.

6. The electronic assembly of claim 1, wherein the capsule has a first end connected to the end cap and a second end having a domed configuration, and wherein the eccentric mass has a rounded distal end positioned at the second end of the capsule.

7. The electronic assembly of claim 1, wherein the vibration motor comprises a motor casing, wherein a distal portion of the shaft protrudes from the motor casing and the eccentric mass is connected to the distal portion of the shaft.

8. The electronic assembly of claim 7, wherein the first connecting structure comprises a first section of a body of the end cap, the first section having a first outer periphery received within the motor casing to connect the end cap to the vibration motor, and wherein the second connecting structure comprises a second section of the body of the end cap, the second section having a second outer periphery that is larger than the first outer periphery, wherein the second section is received within an open end of the capsule to connect the capsule to the end cap.

9. The electronic assembly of claim 8, wherein a first shoulder is defined between the first section and the second section as a result of the second outer periphery being larger than the first outer periphery, and wherein the body of the end cap further comprises a third section connected to the second section and having a third outer periphery that is larger than the second outer periphery such that a second shoulder is defined between the second section and the third section, wherein a proximal end of the motor casing abuts the first shoulder, and wherein a proximal end of the capsule abuts the second shoulder.

10. An electronic assembly comprising:
a structural body comprising a frame member and an overmolded polymer material connected to the frame member; and
a vibration motor assembly embedded within the overmolded polymer material, the vibration motor assembly comprising:
a vibration motor comprising a motor casing, a magnet positioned inside the motor casing, a shaft extending through the motor casing and having a proximal portion extending from a first end of the motor casing, a distal portion extending from a second end of the motor casing, and a middle portion positioned within the motor casing, and a wire winding mounted on the middle portion of the shaft, the vibration motor being configured to use electrical power to rotate the shaft about an axis to create a vibration effect;

an eccentric mass connected to the distal portion of the shaft, such that the eccentric mass is rotatable with the shaft;

an end cap having a body engaged with the vibration motor and electrical contacts engaging the proximal portion of the shaft and configured for supplying electrical power to the vibration motor, the body of the end cap having a first section having a first outer periphery received within the first end of the motor casing and engaging the motor casing to connect the end cap to the vibration motor; and a capsule connected to the end cap to define a cavity, wherein the body of the end cap has a second section having a second outer periphery that is larger than the first outer periphery, such that the second section is received within an open end of the capsule and engages the capsule to connect the capsule to the end cap, and wherein the vibration motor and eccentric mass are disposed in the cavity and are enclosed by the end cap and capsule, so as to enable the vibration motor assembly to withstand fabrication conditions.

11. The electronic assembly of claim 10, further comprising a computer processor and a memory mounted on the structural body.

12. The electronic assembly of claim 10, further comprising a power source mounted on the structural body and connected to the vibration motor assembly to power the vibration motor.

13. The electronic assembly of claim 10, wherein the electronic assembly is a wearable device, and wherein the structural body is structured to enable the wearable device to be worn on a user's body.

14. The electronic assembly of claim 10, wherein the vibration motor and eccentric mass being enclosed by the end cap and the capsule enables the vibration motor assembly to withstand fabrication conditions of an overmolding process to form the overmolded polymer material.

15. The electronic assembly of claim 10, wherein the capsule has closed end opposite the open end, the closed end having a rounded dome configuration, wherein the eccentric mass has a rounded end positioned at the closed end of the capsule.

16. The electronic assembly of claim 10, wherein a first shoulder is defined between the first section and the second section as a result of the second outer periphery being larger than the first outer periphery, and wherein the body of the end cap further comprises a third section connected to the second section and having a third outer periphery that is larger than the second outer periphery such that a second shoulder is defined between the second section and the third section, wherein the first end of the motor casing abuts the first shoulder, and wherein the open end of the capsule abuts the second shoulder.

17. An electronic assembly comprising:
a structural body comprising a frame member and an overmolded polymer material connected to the frame member; and a vibration motor assembly embedded within the overmolded polymer material, the vibration motor assembly comprising:
    a vibration motor comprising a motor casing and a shaft, wherein the vibration motor is configured to rotate the shaft to create a vibration effect;
    a capsule having a cavity;
    an end cap comprising an end cap body engaged with the vibration motor, the end cap body having a first section having a first outer periphery received within the motor casing of the vibration motor to connect the end cap to the vibration motor, a second section having a second outer periphery that is larger than the first outer periphery such that a first shoulder is defined between the first section and the second section, wherein the second section is configured to be received within an open end of the capsule to connect the capsule to the end cap to enclose the vibration motor, and a third section having a third outer periphery that is larger than the second outer periphery such that a second shoulder is defined between the second section and the third section, the end cap body further having a slot within the first section;
    a pair of electrical contacts exposed within the slot and configured for engaging the shaft of the vibration motor to supply electrical power to the vibration motor; and
    a pair of electrical leads connected to the electrical contacts and extending through the end cap body to connect the electrical contacts to an exterior of the end cap.

18. The electronic assembly of claim 17, further comprising a computer processor and a memory mounted on the structural body.

19. The electronic assembly of claim 18, wherein the first outer periphery has two flat sides and two rounded sides, and wherein the second outer periphery has a circular shape.

20. The electronic assembly of claim 17, further comprising a power source mounted on the structural body and connected to the vibration motor assembly to power the vibration motor.

21. The electronic assembly of claim 17, wherein the electronic assembly is a wearable device, and wherein the structural body is structured to enable the wearable device to be worn on a user's body.

22. The electronic assembly of claim 17, wherein the capsule being connected to the end cap to enclose the vibration motor enables the vibration motor to withstand fabrication conditions.

23. The electronic assembly of claim 17, wherein the first outer periphery and the second outer periphery have different peripheral shapes, such that the first shoulder has a varying width at different locations around the first and second outer peripheries.

24. The electronic assembly of claim 17, wherein each of the electrical leads makes at least one bend while passing through the end cap body between the electrical contacts and the exterior of the end cap.

25. An electronic assembly comprising:
    a structural body comprising a frame member and an overmolded polymer material connected to the frame member;
    a plurality of vibration motor assemblies embedded within the overmolded polymer material, each vibration motor assembly comprising:
        a capsule having a cavity;
        a vibration motor having a shaft and configured to rotate the shaft;
        an eccentric mass connected to the shaft, wherein the eccentric mass is rotatable with the shaft; and
        an end cap connected to the vibration motor and also connected to the capsule such that the vibration motor and the eccentric mass are disposed in the cavity and enclosed by the end cap and capsule; and
    a computer device connected to the structural body, wherein the computer device is in communication with the plurality of vibration motor assemblies and is configured for selectively activating one or more of the vibration motor assemblies.

26. The electronic assembly of claim 25, wherein the computer device is configured for selectively activating the one or more of the vibration motor assemblies based on at least one of an orientation, a position, and a movement of the electronic assembly.

27. The electronic assembly of claim 26, further comprising one or more movement sensors configured for detecting the at least one of the orientation, the position, and the movement of the electronic assembly, wherein the computer device is in communication with the one or more movement sensors and is configured for selectively activating the one or more of the vibration motor assemblies based on data received from the one or more movement sensors.

28. A method comprising:
    providing a vibration motor assembly comprising:
        a capsule having a cavity;
        a vibration motor having a shaft and configured to rotate the shaft;
        an eccentric mass connected to the shaft, wherein the eccentric mass is rotatable with the shaft; and
        an end cap having a first connecting structure connecting the end cap to the vibration motor and having and a second connecting structure connecting the capsule to the end cap,
        wherein the vibration motor and eccentric mass are disposed in the cavity and are enclosed by the end cap and capsule;
    establishing an electrical connection between the vibration motor and an electronic assembly;
    overmolding the vibration motor assembly and at least a portion of the electronic assembly with a flowable substance under fabrication conditions to connect the vibration motor assembly to the electronic assembly, wherein the vibration motor assembly is embedded within the flowable substance when the flowable substance solidifies, and wherein the connection between the capsule and the end cap enables the vibration motor assembly to withstand the fabrication conditions.

29. The method of claim 28, wherein the vibration motor is electrically connected to the electronic assembly prior to the overmolding.

30. The method of claim 28, wherein the vibration motor assembly is subjected to pressure of about 3000-5000 psi when the flowable substance is overmolded.

* * * * *